United States Patent
Kiryakov et al.

(10) Patent No.: US 9,292,571 B1
(45) Date of Patent: Mar. 22, 2016

(54) JOINING DATABASE TABLES

(71) Applicant: MicroStrategy Incorporated, Vienna, VA (US)

(72) Inventors: Yuliyan Kiryakov, Arlington, VA (US); Benjamin Z. Li, McLean, VA (US); Rixin Liao, Herndon, VA (US)

(73) Assignee: MicroStrategy Incorporated, Vienna, VA (US)

( * ) Notice: Subject to any disclaimer, the term of this patent is extended or adjusted under 35 U.S.C. 154(b) by 123 days.

(21) Appl. No.: 13/745,534

(22) Filed: Jan. 18, 2013

(51) Int. Cl.
*G06F 7/02* (2006.01)
*G06F 17/30* (2006.01)

(52) U.S. Cl.
CPC ...... *G06F 17/30466* (2013.01); *G06F 17/3048* (2013.01); *G06F 17/30442* (2013.01); *G06F 17/30595* (2013.01)

(58) Field of Classification Search
CPC ............. G06F 17/30466; G06F 17/30442; G06F 17/3048; G06F 17/30595; G06F 17/30
See application file for complete search history.

(56) References Cited

U.S. PATENT DOCUMENTS

| | | | |
|---|---|---|---|
| 6,684,203 B1 * | 1/2004 | Waddington et al. | 707/714 |
| 7,702,619 B2 * | 4/2010 | El-Sabbagh | 707/999.003 |
| 8,914,352 B2 * | 12/2014 | Chaves et al. | 707/714 |
| 2002/0120620 A1 * | 8/2002 | Chan et al. | 707/3 |
| 2005/0060342 A1 * | 3/2005 | Farag | G06F 17/30286 |
| 2008/0059492 A1 * | 3/2008 | Tarin | G06F 17/30315 |
| 2011/0161280 A1 * | 6/2011 | Luo | 707/604 |
| 2012/0197866 A1 * | 8/2012 | Xu | G06F 17/30412 707/713 |
| 2012/0310916 A1 * | 12/2012 | Abadi et al. | 707/713 |
| 2012/0317094 A1 * | 12/2012 | Bear et al. | 707/714 |

* cited by examiner

*Primary Examiner* — Bruce Moser
(74) *Attorney, Agent, or Firm* — Fish & Richardson P.C.

(57) ABSTRACT

In one implementation, a query is received that is related to data stored in a database that is implemented in computer memory. Based on the received query, attributes of data stored in the database that are relevant to generating a response to the received query are identified. Information that is indicative of attributes for which values are recorded in different tables included in the database is accessed. Based on having accessed this information, tables included in the database that record values for the attributes identified as being relevant to generating a response to the received query are identified. These tables then are joined to create, within computer memory, a new table that reflects relationships between values of attributes identified as being relevant to generating a response to the received query.

15 Claims, 16 Drawing Sheets

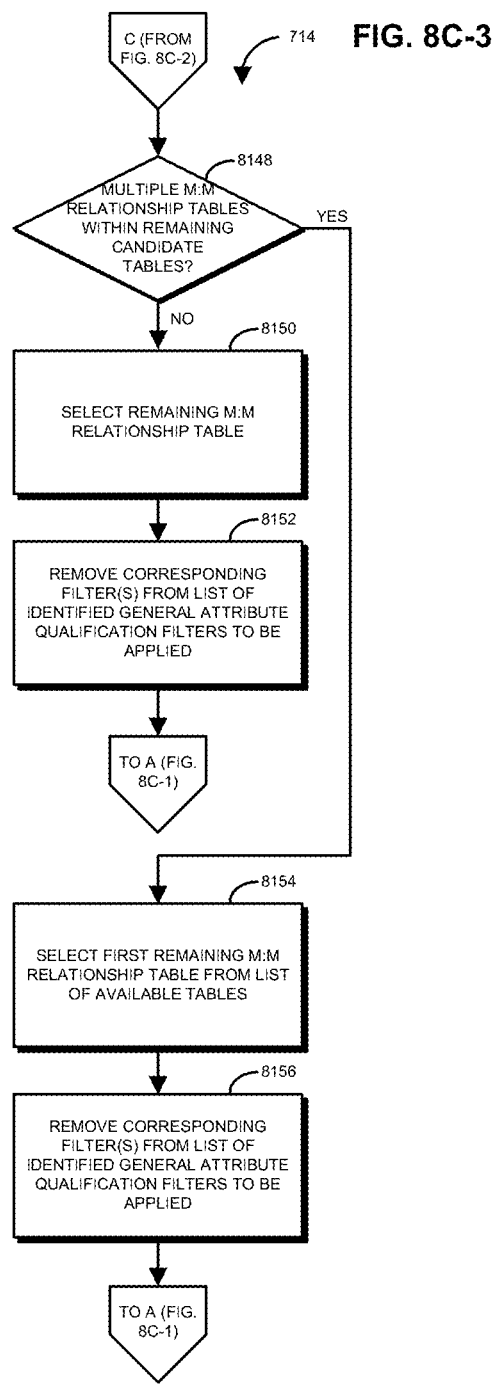

JOINING DATABASE TABLES

BACKGROUND

Databases may include multiple different tables that record data.

DETAILED DESCRIPTION

A database, including, for example, a multi-dimensional analytical database, may be implemented in main memory, such as, for example, random-access memory (RAM) (including dynamic RAM (DRAM) and static RAM (SRAM)), flash memory, etc. The database and the computer memory within which the database is implemented may reside in a single computing device and/or the database and the computer memory within which the database is implemented may be distributed or partitioned across multiple different computing devices. Furthermore, even within the memory of a single computing device, the database may be implemented across multiple different partitions.

Such a database may include multiple different tables, some of which may be related to one another (e.g., using primary and foreign keys). Furthermore, such a database may include, among other data structures, multiple different fact tables (e.g., recording measures like numeric facts and associated attributes) and multiple different relationship tables (e.g., recording relationships between values of different attributes).

In response to a query for data stored in such a database, attributes relevant to the query (and, in some cases, filters to be applied to values of one or more such attributes in generating a response to the query) may be identified. Thereafter, tables that store values for the identified attributes (and/or tables that store values for attributes that enable the identified filters to be applied) also may be identified, and a table join tree may be composed summarizing a process through which the various different identified tables may be joined to create a new table that may facilitate generating a response to the query (e.g., by providing appropriate keys into one or more of the fact tables of the database). As described herein, in some cases, one or more filters may be applied to an individual table before joining the table with another table. Additionally or alternatively, as also described herein, in some cases, one or more filters may be applied at a branch within the table join tree (e.g., after two or more tables have been joined).

Figure 1:
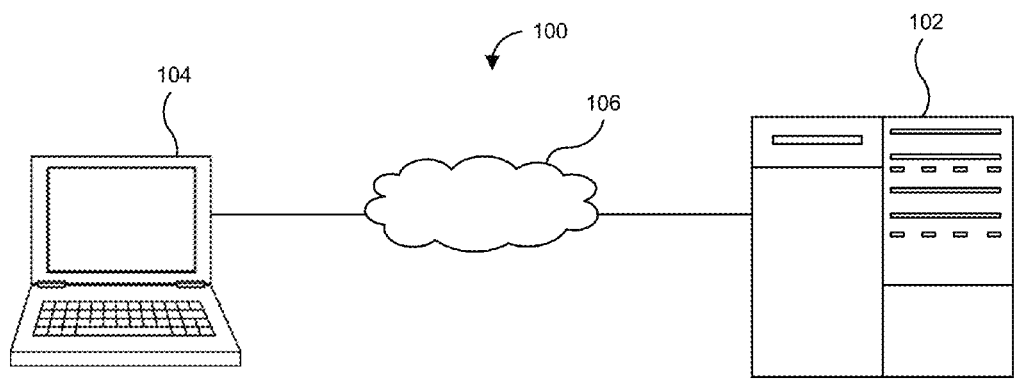
FIG. 1 is a block diagram of a network computing environment.

FIG. 1 is a block diagram of a network computing environment 100. For illustrative purposes, several elements illustrated in FIG. 1 and described below are represented as monolithic entities. However, these elements each may include and/or be implemented on numerous interconnected computing devices and other components that are designed to perform a set of specified operations.

As illustrated in FIG. 1, the network computing environment 100 includes a computing system 102 that is accessible to a number of other computing devices such as, for example, computing device 104, over a network 106.

Computing system 102 may be implemented using one or more computing devices (e.g., servers) configured to provide a service to one or more client devices (e.g., computing device 104) connected to computing system 102 over network 106. The one or more computing devices on which computing system 102 is implemented may have internal or external storage components storing data and programs such as an operating system and one or more application programs. Furthermore, the one or more computing devices on which computing system 102 is implemented each may include one or more processors for executing instructions stored in storage and/or received from one or more other electronic devices, for example over network 106. In addition, these computing devices also typically may include network interfaces and communication devices for sending and receiving data.

Computing device 104 may be any of a number of different types of computing devices including, for example, a laptop computer, a mobile phone, a smartphone, a personal digital assistant, a tablet computer, a netbook computer, a desktop computer, etc. Computing device 104 typically may have internal or external storage components for storing data and programs such as an operating system and one or more application programs. In particular, the internal or external storage components for computing device 104 may store a client application for interfacing with computing system 102. Additionally or alternatively, computing device 104 may be configured to interface with computing system 102 without a specific client application, using, for example, a web browser.

Computing device 104 also typically may include a central processing unit (CPU) for executing instructions stored in storage and/or received from one or more other electronic devices, for example over network 106. Computing device 104 also usually may include one or more communication devices for sending and receiving data. Examples of such communication devices include modems, antennas, transceivers, communications cards, and other network adapters capable of transmitting and receiving data over a network (e.g., network 106) through a wired or wireless data pathway.

Network 106 may provide direct or indirect communication links between computing system 102 and computing device 104. Examples of network 106 include the Internet, the World Wide Web, wide area networks (WANs), local area networks (LANs) including wireless LANs (WLANs), analog or digital wired and wireless telephone networks, radio, television, cable, satellite, and/or any other delivery mechanisms for carrying data as well as combinations of any of the foregoing.

One or more databases, including, for example, one or more multi-dimensional analytical databases, may be implemented by computing system 102. In some implementations, such databases may be implemented within main memory components of computing system 102. Computing system 102 may make data recorded in the one or more databases implemented by computing system 102 available to users of computing system 102, for example, via one or more computing devices (e.g., computing device 104) communicatively coupled to computing system 102 over network 106. Furthermore, computing system 102 and/or one or more other computing devices communicatively coupled to computing system 102, like computing device 104, may provide users with various tools for analyzing data recorded in one or more of the databases implemented by computing system 102.

As one example, a database recording data relevant to different entities represented within an electronic social networking platform may be implemented by computing system 102. In this example, the database may record data associated with users of the electronic social networking platform, including, among other information, users' names, ages, genders, education levels, countries of residence, etc. Additionally or alternatively, the database also may record data associated with pages that are hosted within the electronic social networking platform representing, among other entities, businesses and other locations that may be of interest to users of the electronic social networking platform. For example, among other information, the database may record information about categories that have been assigned to individual pages. Furthermore, the electronic social networking platform may enable users of the electronic social networking platform to post comments to such pages, to register endorsements (e.g., "likes") of such pages, and/or to register check-ins at physical locations associated with such pages, and the database may record information about comments posted to pages by users of the electronic social networking platform, endorsements of pages by users of the electronic social networking platform, and check-ins registered at physical locations associated with pages by users of the electronic social networking platform. In some implementations, the database may record data associated with many millions or billions of users of the electronic social networking platform and the database may record data associated with many millions or billions of pages hosted within the electronic social networking platform.

In this example, computing system 102 and/or computing device 104 may provide users with tools that enable the users to access and/or analyze the information recorded in the database about users of the electronic social networking platform and/or pages hosted within the electronic social networking platform. For example, among other tools, computing system 102 and/or computing device 104 may provide users with tools that enable the users to identify different segments of users of the electronic social networking platform (e.g., by filtering based on characteristics of the users of the electronic social networking platform like age, gender, education level, country of residence, etc.) and to analyze interests of members of such segments according to comments posted to pages by members of such segments, endorsements of pages registered by members of such segments, and/or check-ins registered at physical locations associated with pages registered by members of such segments.

Figure 2A:
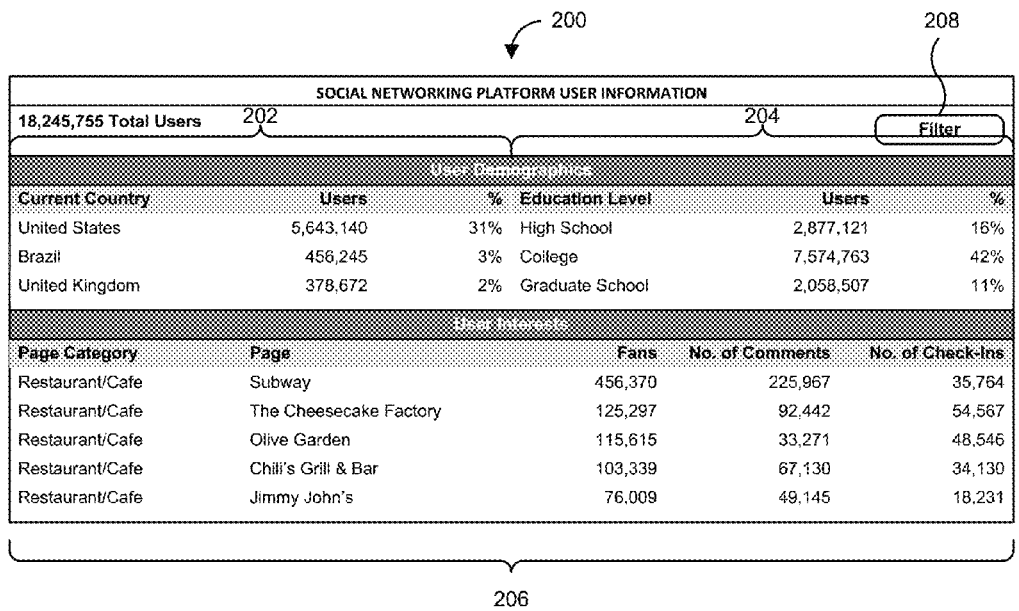
FIGS. 2A-2C are diagrams of examples of a user interface for a tool that enables a user to access and analyze data recorded in a database.
Figure 2B:
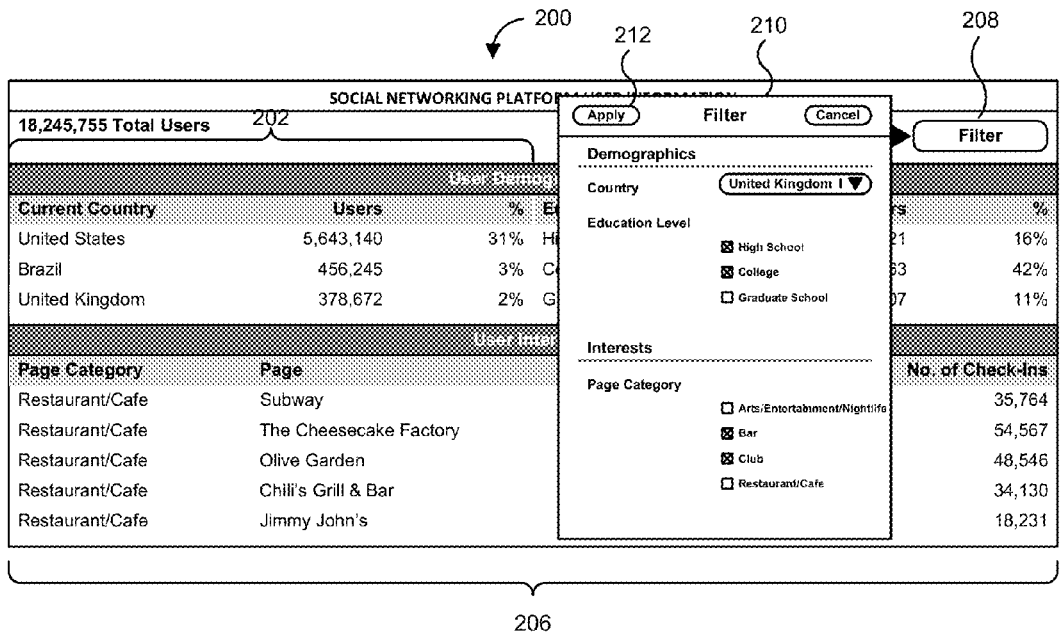
Figure 2C:
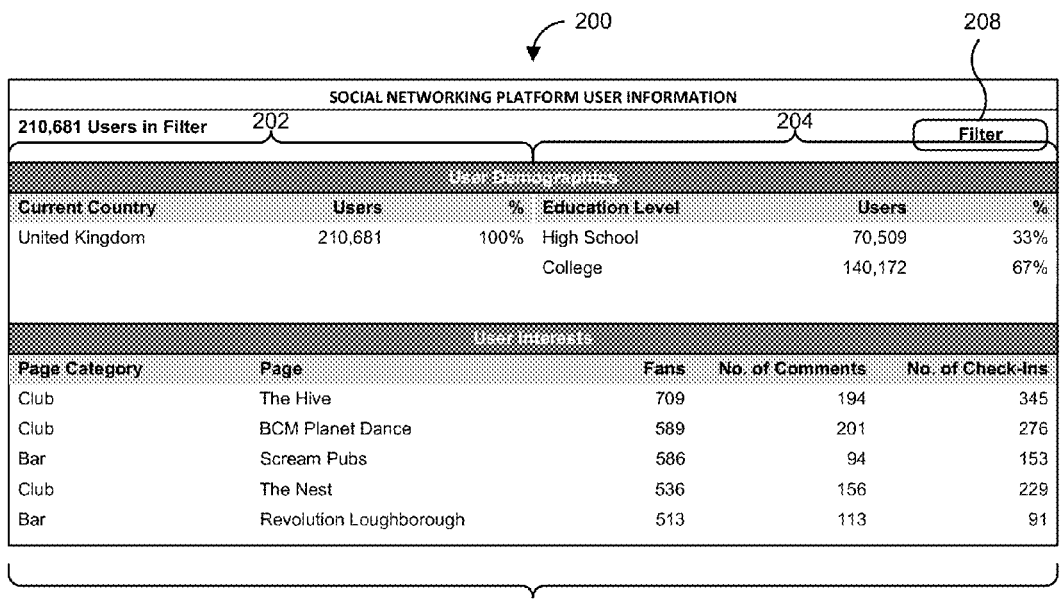

FIGS. 2A-2C are diagrams of examples of a user interface 200 for a tool that enables a user to access and analyze data recorded in a database, such as, for example, a database implemented by computing system 102 as illustrated in and described above in connection with FIG. 1. User interface 200 may be rendered on a computing device, such as, for example, computing device 104 of FIG. 1.

Continuing with the example introduced above in connection with FIG. 1, the database may record data associated with users of an electronic social networking platform, including, among other information, users' names, ages, genders, education levels, countries of residence, etc. Additionally or alternatively, the database also may record data associated with pages that are hosted within the electronic social networking platform, including, among other information, categories assigned to pages, information about comments posted to pages by users of the electronic social networking platform, endorsements of pages by users of the electronic social networking platform, and check-ins registered at physical locations associated with pages by users of the electronic social networking platform.

Referring first to FIG. 2A, user interface 200 includes three different views 202, 204, and 206 of data recorded in the database. View 202 presents information about current countries of residence of users of the electronic social networking platform. More particularly, view 202 identifies the three top countries of current residence of users of the electronic social networking platform along with the number of users who reside in each of the top three countries and the percentage of users of the electronic social networking platform for whom data is recorded in the database that reside in each of the top three countries.

Similarly, view 204 presents information about education levels of users of the electronic social networking platform. More particularly, view 204 presents the number and percentage of users of the electronic social networking platform for whom data is recorded in the database whose highest level of education is high school, the number and percentage of users of the electronic social networking platform for whom data is recorded in the database whose highest level of education is college, and the number and percentage of users of the electronic social networking platform for whom data is recorded in the database whose highest level of education is graduate school.

Meanwhile, view 206 presents information about pages hosted within the electronic social networking platform perceived as being most popular with users of the electronic social networking platform based on the number of users of the electronic social networking platform who have recorded endorsements of the pages. More particularly, view 206 identifies the five pages hosted within the electronic social networking platform that have been endorsed by the greatest number of users of the electronic social networking platform. In addition, for each of these five pages, view 206 presents the number of comments that have been posted to the pages by users of the electronic social networking platform and the number of check-ins that have been registered at physical locations associated with the pages.

In order to populate views 202, 204, and 206 of user interface 200 with appropriate data, when a user launches or navigates to user interface 200, the computing device on which user interface 200 is rendered may issue one or more queries for data from the database. For example, when a user launches or navigates to user interface 200, the computing device may issue one or more separate queries for data from the database to populate view 202, one or more separate queries for data from the database to populate view 204, and/or one or more separate queries for data from the database to populate view 206. Furthermore, the computing device subsequently may issue additional queries to refresh the data presented in views 202, 204, and 206, for example, in case the data recorded in the database changes.

As illustrated in FIGS. 2A-2C, in addition to views 202, 204, and 206, interface 200 also includes filter control 208. Referring now to FIG. 2B, responsive to user invocation of filter control 208, user interface 200 causes a filter menu 210 to be displayed. Filter menu 210 provides controls that enable a user to specify a segment of the users of the electronic social networking platform by applying filters to the current countries of residence and the education levels of the users of the electronic social networking platform. In addition, filter menu 210 provides controls that enable a user to specify the types of pages for which information about pages perceived as being popular with members of a segment of users of the electronic social networking platform should be presented in view 206 by applying a filter to the categories associated with the pages hosted within the electronic social networking platform.

As illustrated in FIG. 2B, a user has used filter menu 210 to specify that the users of the electronic social networking platform should be filtered into a segment that is limited to users who currently reside in the United Kingdom and whose highest level of education is high school or college. In addition, the user has used filter menu 210 to specify that view 206 should present information only about pages categorized as being associated with either bars or nightclubs that have been endorsed by the greatest number of users of the electronic social networking platform who currently reside in the United Kingdom and who have a highest level of education of either high school or college. Responsive to user invocation of apply control 212, user interface 200 causes the filters specified in filter menu 210 to be applied. For example, in response to user invocation of apply control 212, user interface 200 may cause the computing device on which user interface 200 is rendered to issue new queries for data from the database to populate views 202, 204, and 206 with data according to the filters specified in filter menu 210.

Referring now to FIG. 2C, user interface 200 has updated the data presented in views 202, 204, and 206 according to the filters specified in filter menu 210 of FIG. 2B. In particular, view 202 has been updated to reflect information about the current country of residence of members of the segment of users of the electronic social networking platform defined in filter menu 210 of FIG. 2B, and view 204 has been updated to reflect information about the education levels of members of the segment of users of the electronic social networking platform defined in filter menu 210 of FIG. 2B.

As illustrated in FIG. 2C, view 202 has been updated to identify the United Kingdom as the only country of residence of members of the defined segment of users of the social networking platform and to indicate that 100% of the members of the defined segment of users of the social networking platform reside in the United Kingdom because the segment of users defined in filter menu 210 of FIG. 2B is limited to users who currently reside in the United Kingdom. Furthermore, updated view 202 indicates that there are 210,681 members of the defined segment of users of the electronic social networking platform. That is to say, there are 210,681 users of the electronic social networking platform who currently reside in the United Kingdom and whose highest level of education is either high school or college. Similarly, view 204 has been updated to identify high school and college as the only education levels of members of the defined segment of users of the social networking platform because the segment of users defined in filter menu 210 of FIG. 2B is limited to users whose highest level of education is high school or college. Finally, view 206 has been updated to identify the five pages categorized as being associated with either bars or clubs that have been endorsed by the greatest number of members of the defined segment of users of the electronic social networking platform. In addition, view 206 has been updated to reflect the number of comments posted to each of these five pages by members of the defined segment of users of the electronic social networking platform and the number of check-ins at physical locations associated with each of these five pages registered by members of the defined segment of users of the electronic social networking platform.

As described above, an in-memory database, such as, for example, an in-memory, multi-dimensional, analytical database, may include, among other data structures, one or more fact tables and one or more relationship tables. In addition, such an in-memory database also may include one or more lookup tables. When a query for data stored in such an in-memory database is received, a table join tree may be composed in response to the query to outline a process for joining various different tables of the database (and, in some cases, for applying one or more different filters) to create a new table to facilitate the generation of a response to the query.

Continuing with the example database recording data relevant to different entities represented within an electronic social networking platform introduced above in connection with FIGS. 1 and 2A-2C, the discussion that follows first describes one example of an in-memory, multi-dimensional, analytical database that includes multiple fact tables, multiple relationship tables, and multiple lookup tables. Thereafter, the following discussion describes examples of processes for composing a table join tree to create a new table from the tables of such an in-memory, multi-dimensional, analytical database to facilitate the generation of a response to a query for data from the in-memory, multi-dimensional, analytical database.

Figure 3:
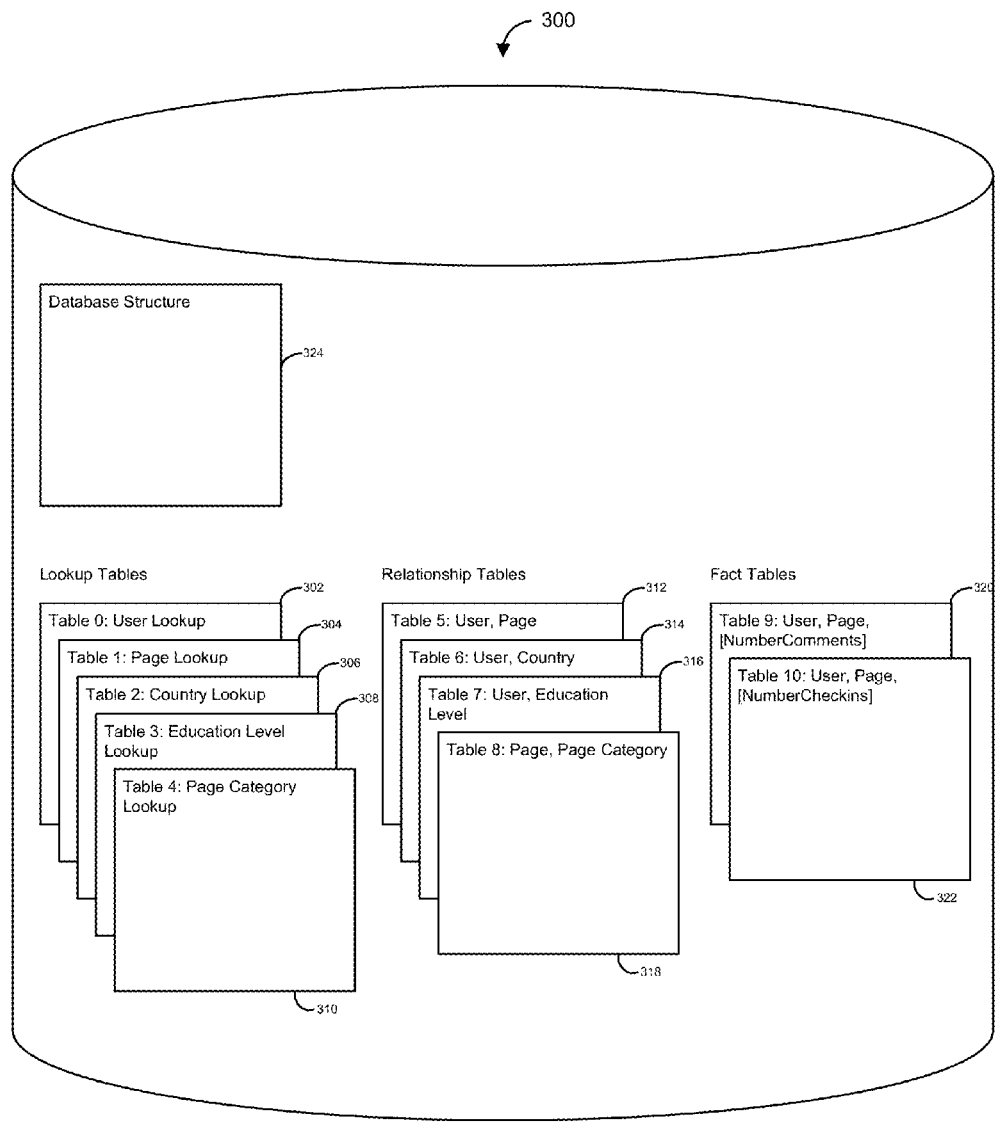
FIG. 3 is a block diagram of an example of a database.

FIG. 3 is a block diagram of an example of a multi-dimensional, analytical database 300 recording data relevant to different entities represented within an electronic social networking platform. Database 300 may be implemented in main memory of a computing system, such as, for example, computing system 102 of FIG. 1. In some implementations, the computing system within which database 300 is implemented may include multiple different computing devices, each having its own corresponding main memory. In such implementations, database 300 may be partitioned or otherwise distributed across multiple of the different computing devices of the computing system. Additionally or alternatively, even within the main memory of a single computing device of the computing system 102, database 300 may be implemented across multiple different partitions.

As illustrated in FIG. 3, database 300 includes five lookup tables. In particular, database 300 includes a user lookup table 302, a page lookup table 304, a country lookup table 306, an education level lookup table 308, and a page category lookup table 310. Generally, a lookup table may be associated with a particular attribute and record the different forms of the attribute within the database. The offset for a particular form of an attribute within the lookup table for the attribute may operate as the index for the attribute in the lookup table. For example, user lookup table 302 may record the names of each of the users of the electronic social networking platform, and the offset for each user name in user lookup table 302 may operate as the index for that user name in the user lookup table 302. Similarly, page lookup table 304 may record the names of each of the pages of the electronic social networking platform, and the offset for each page name in page lookup table 304 may operate as the index for that page in page lookup table 304; and country lookup table 306 may record the names of the different countries of residence of users of the electronic social networking platform and the offset for each country name in country lookup table 306 may operate as the index for that country in country lookup table 306. Likewise, education level lookup table 308 may record the different education levels of users of the electronic social networking platform (e.g., high school, college, or graduate school), and the offset for each education level in education level lookup table 308 may operate as the index for that education level in education level lookup table 308. Finally, page category lookup table 310 may record the different categories assigned to pages hosted within the electronic social networking platform, and the offset for each category in page category lookup table 310 may operate as the index for that category in page category lookup table 310.

In addition to the five lookup tables, database 300 also includes four relationship tables. In particular, database 300 includes user:page relationship table 312, user:country relationship table 314, user:education level relationship table 316, and page:page category relationship table 318. Generally, a relationship table may record relationships between values of a first attribute and values of a second attribute. Depending on the attributes for which corresponding related values are recorded in a particular relationship table, the particular relationship table may be a one-to-many (1:M) relationship table or a many-to-many relationship table (M:M).

user:page relationship table 312 may record relationships between users of the electronic social networking platform and the pages the users have endorsed. Within user:page relationship table 312, individual users may be represented by their indices in user lookup table 302 and individual pages may be represented by their indices in page lookup table 304. Furthermore, because a user may endorse multiple pages within the electronic social networking platform and an individual page may be endorsed by many different users of the electronic social networking platform, user:page relationship table 312 may be considered to be a many-to-many relationship table.

user:country relationship table 314 may record relationships between users of the electronic social networking platform and the countries in which they reside. Within user:country relationship table 314, individual users may be represented by their indices in user lookup table 302 and individual countries may be represented by their indices in country lookup table 306. Furthermore, because a user can only reside in one country, but an individual country can have multiple different residents, user:country relationship table 314 may be considered to be a one-to-many relationship table.

user:education level relationship table 316 may record relationships between users of the electronic social networking platform and their education levels. Within user:education level relationship table 316, individual users may be represented by their indices in user lookup table 302 and individual education levels may be represented by their indices in education level lookup table 308. Furthermore, because a user can only have one education level, but an individual education level can be associated with multiple different users, user:education level relationship table 316 may be considered to be a one-to-many relationship table.

page:page category relationship table 318 may record relationships between pages hosted within the electronic social networking platform and categories assigned to the pages. Within page:page category relationship table 318, individual users may be represented by the indices in user lookup table 302 and individual page categories may be represented by their indices in page category lookup table 310. Furthermore, because a page only can be assigned one category, but an individual category can be assigned to multiple different pages, page:page category relationship table 318 may be considered to be a one-to-many relationship table.

In addition to the five lookup tables and four relationship tables, database 300 also includes two fact tables. In particular, database 300 includes comments fact table 320 and check-ins fact table 322. Generally, a fact table may record measures like numeric facts and associated attributes. For example, comments fact table 320 may record the number of comments (e.g., a measure) posted by a particular user of the electronic social networking platform (e.g., an attribute) to a particular page hosted within the electronic social networking platform (e.g., an attribute). Similarly, check-ins fact table 322 may record the number of check-ins (e.g., a measure) registered by a particular user of the electronic social networking platform (e.g., an attribute) with physical locations associated with a particular page hosted within the electronic social networking platform (e.g., an attribute). Within both comments fact table 320 and check-ins fact table 322, individual users may be represented by their indices in user lookup table 302, and individual pages may be represented by their indices in page lookup table 304.

In addition to the five lookup tables, four relationship tables, and two fact tables, database 300 also includes a data structure 324 storing information about the structure of database 300 (e.g., schema information for the tables included in database 300). For example, for individual tables included in database 300, data structure 324 may store information about the attributes for which values are recorded in the table (potentially including which forms of the attributes are selected in the table), information about how attributes for which values are recorded in the table are related to other attributes (e.g., parent-child relationships between attributes), and/or information about metrics recorded in the table (e.g., metric definitions and metric levels). Table 1 below visually illustrates one example of types of information that may be recorded in data structure 324 for the tables included in database 300.

TABLE 1

| Table | Attribute(s)/ Metric Level(s) | Metric(s) | Table Type |
|---|---|---|---|
| 0 | user | | lookup |
| 1 | page | | lookup |
| 2 | current country | | lookup |
| 3 | education level | | lookup |
| 4 | page category | | lookup |
| 5 | user, page | | relationship (M:M) |
| 6 | user, current country | | relationship (1:M) |
| 7 | user, education level | | relationship (1:M) |
| 8 | page, page category | | relationship (1:M) |
| 9 | user, page | NumberComments | fact |
| 10 | user, page | NumberCheckins | fact |

As described above, when a query for data recorded in an in-memory database like database 300 is received, a table join tree may be composed in response to the query to outline a process for joining various different tables of the database (and, in some cases, for applying one or more different filters) to create a new table to facilitate the generation of a response to the query. The discussion that follows describes examples of processes for composing such a table join tree.

Figure 4:
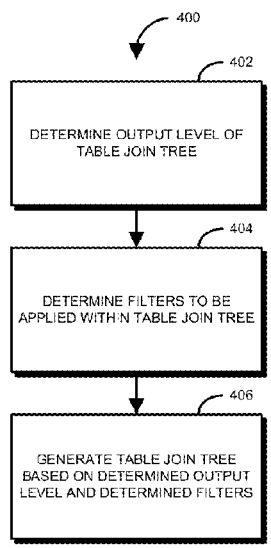
FIGS. 4-7 and 8A-8E are flowcharts that illustrate examples of different processes.

FIG. 4 is a flowchart 400 that illustrates an example of a process for composing a table join tree to facilitate the generation of a response to a query for data recorded in a database. The process illustrated in the flowchart 400 of FIG. 4 may be performed by a computing system, such as, for example, computing system 102 of FIG. 1.

Based on the received query, the computing system determines the output level to be obtained for the table join tree (402). As described in greater detail below, the process illustrated in the flowchart 402 of FIG. 5 is one example of a process for determining the output level to be obtained for a table join tree.

Figure 6:
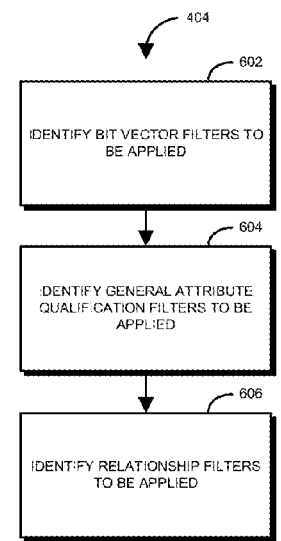

As part of composing the table join tree, the computing system also determines filters to be applied within the table join tree to facilitate generation of a response to the query (404). As described in greater detail below, the process illustrated in the flowchart 404 of FIG. 6 is one example of a process for determining filters to be applied within a table join tree to facilitate generation of a response to a query.

Figure 7:
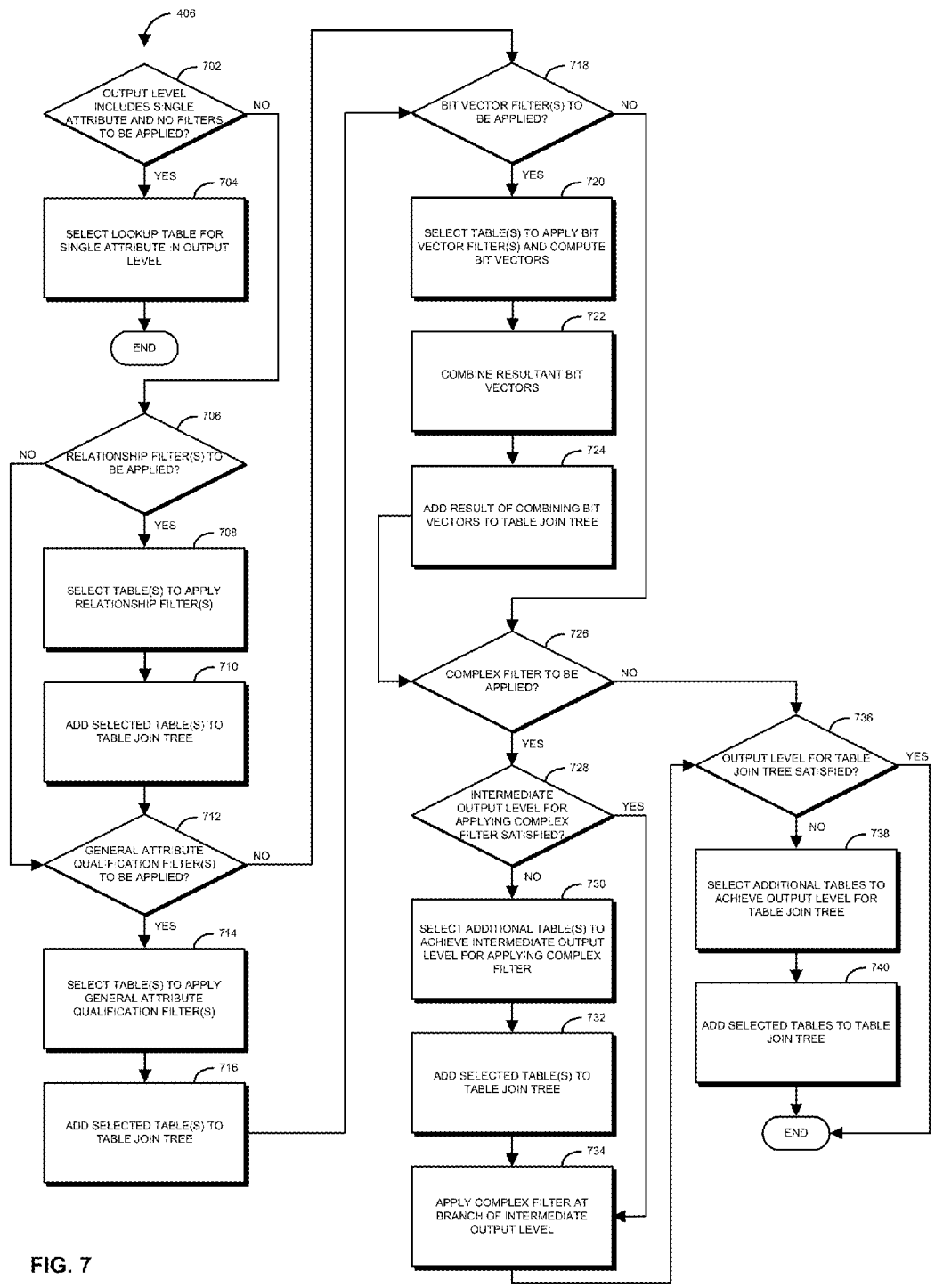

After determining the output level to be obtained for the table join tree and any filters to be applied within the table join tree, the computing system then generates the table join tree based on the determined output level and the determined filters to be applied within the table join tree (406). As described in greater detail below, the process illustrated in the flowchart 406 of FIG. 7 is one example of a process for generating a table join tree based on the determined output level to be obtained for the table join tree and the determined filters to be applied within the table join tree.

Figure 5:
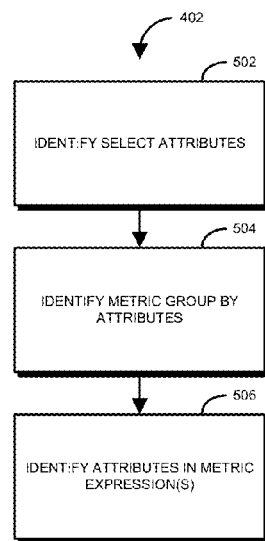

FIG. 5 is a flowchart 402 that illustrates an example of a process for determining the output level to be obtained for a table join tree to facilitate the generation of a response to a query for data recorded in a database. The process illustrated in the flowchart 402 of FIG. 5 is one example of a process for performing operation 402 of the flowchart 400 of FIG. 4. The process illustrated in the flowchart 402 of FIG. 5 may be performed by a computing system, such as, for example, computing system 102 of FIG. 1.

For the purposes of illustration, consider the example database 300 described above in connection with FIG. 3 and the example view 206 of data recorded in database 300 presented in user interface 200 of FIG. 2C. Database 300 may be queried in order to present the view 206 of the data recorded in database 300 that is illustrated in the user interface 200 of FIG. 2C. A snippet of one example of such a query is presented below:

select [Page_Category]@[PAGECAT_ID_BIGDEC19],
   [Page]@[PAGE_ID_BIGDEC19],
   count ([User]@[FAN_ID_BIGDEC19])@{[Page]} as [Fans],
   sum([Table9.NumberComments])@{[Page]} as [Number Comments],
   sum([Table10.NumberVisits])@{[Page]} as [Number Check-Ins]

In addition, the query also may specify that the following filters be applied:

Filter: [Current Country]@[USER_COUNTRY_ID] in (257)
   AND [Education Level]@[EDUCATION_LEVEL_ID] in (1, 2)
   AND [Page_Category]@[PAGECAT_ID_BIGDEC19] in (3, 4)

where "257" represents the index of the country "United Kingdom" in country lookup table 306, "1" represents the index of the education level "High School" in education level lookup table 308, "2" represents the index of the education level "College" in education level lookup table 308, "3" represents the index of the page category "Bar" in page category lookup table 310, and "4" represents the index of the page category "Club" in page category lookup table 310. The example of a process for determining the output level to be obtained for a table join tree illustrated in the flowchart 402 of FIG. 5 now is described, making reference to this example query.

Attributes included in the select statement are identified (502). In the example query introduced above, Page and Page Category may be identified as attributes included in the select statement.

Attributes included in the metric group by clause also are identified (504). In the example query introduced above, Page may be identified as an attribute included in the metric group by clause.

Attributes included in metric expressions are identified as well (506). In the example query introduced above, User may be identified as an attribute included in a metric expression.

In addition, the keys for any fact tables relevant to the query are identified (508). In the example query introduced above, both comments fact table 320 and check-ins fact table 322 are relevant to the query. Consequently, the User and Page attributes, which are the keys for the comments fact table 320 and the check-ins fact table 322, may be identified as the keys for the fact tables that are relevant to the query introduced above.

As described in greater detail below, filters to be applied to facilitate the generation of a response to a query may be applied within the table join tree. For example, filters may be applied to one or more individual tables within the table join tree and/or filters may be applied at one or more branches of the table join tree. However, in some situations, it may not be possible to apply one or more filters that facilitate the generation of a response to a query within the table join tree (or a decision against applying one or more filters that facilitate the generation of a response to the query within the table join tree may be made). Consequently, in some situations, one or more filters may be applied after the table join tree has been executed, for example, as a where clause. In such scenarios, attributes for the where clause may be identified (510).

Additionally or alternatively, in some scenarios, a query may include a having (or similar) clause to be executed after the execution of the table join tree. In such scenarios, attributes for the having clause may be identified (512). In some implementations, the database may be implemented across multiple different partitions of a single computing device and/or the database may be partitioned across multiple different computing devices. In such implementations, multiple having clauses may be executed as part of generating a response to the query, and attributes for each of the having clauses may be identified. One or more such having clauses may be executed in the individual partitions. Additionally or alternatively, one or more such having clauses may be executed after data returned from the individual partitions has been merged.

After the process illustrated in the flowchart 402 has completed, the attributes identified as a result of executing the process may be analyzed and any redundant attributes may be removed from the set of identified attributes. For example, after the process illustrated in the flowchart 402 has completed for the example query introduced above, redundant attributes may be removed from the set of identified attributes such that User, Page, and Page Category are the attributes determined to represent the output level of the table join tree.

FIG. 6 is a flowchart 404 that illustrates an example of a process for determining filters to be applied within a table join tree to facilitate the generation of a response to a query for data recorded in the database. The process illustrated in the flowchart 404 of FIG. 6 is one example of a process for performing operation 404 of the flowchart 400 of FIG. 4. The process illustrated in the flowchart 404 of FIG. 6 may be performed by a computing system, such as, for example, computing system 102 of FIG. 1.

As with the process illustrated in the flowchart 402 of FIG. 5, the process illustrated in the flowchart 404 of FIG. 6 is described making reference to the example query introduced above in connection with FIG. 5.

Bit vector filters to be applied are identified (602). An attribute qualification filter for a particular attribute that can be represented as bit vector filter on a lookup table for the particular attribute may be considered to be a bit vector filter. For example, referring to the example database 300 illustrated in FIG. 3, some attribute qualification filters for the attribute User may be represented as bit vector filters on the user lookup table 302. In particular, any filter for which values of the attribute User are filtered according to values for another particular attribute for which there is a table that relates values of the attribute User to values for the other particular attribute may be represented as a bit vector filter on the user lookup table 302. These filters may be considered to be bit vector filters.

As discussed above, in some implementations, the database may be implemented across multiple different partitions of a single computing device and/or the database may be partitioned across multiple different computing devices. In such implementations, different partitions may store different data. Consequently, bit vector filters to be applied to individual partitions may be identified, and different bit vector filters may be identified to be applied to different partitions.

Referring to the example query introduced above, the following filters may be identified as bit vector filters:
[Current Country]@[USER_COUNTRY_ID] in (257)
[Education Level]@[EDUCATION_LEVEL_ID] in (1, 2)
because they filter values of the attribute User according to values of the attributes Country and Education Level and because user:country relationship table 314 relates values of the attribute User to values of the attribute Country and user: education level lookup table 316 relates values of the attribute User to values of the attribute Education Level.

As part of implementing the Current Country bit vector filter identified above, a bit vector on user lookup table 302 may be generated where the bits corresponding to users for which user:country relationship table 314 indicates the users currently reside in the country having an index of "257" in country lookup table 306 are all set to one value (e.g., "1") and the bits corresponding to all other users are set to another value (e.g., "0"). Similarly, as part of implementing the Education Level bit vector filter identified above, another bit vector on user lookup table 302 may be generated where the bits corresponding to users for which user:education level relationship table 316 indicates the users have the education levels having indices of "1" or "2" in education level lookup table 308 are all set to one value (e.g., "1") and the bits corresponding to all other users are set to another value (e.g., "0"). These two bit vectors then may be combined (e.g., ANDed) to generate a single bit vector that can be filtered to return only users who currently reside in the country having an index of "257" in country lookup table 306 and who have education levels having indices of "1" or "2" in education level lookup table 308.

In addition to identifying bit vector filters to be applied, general attribute qualification filters are identified (604). Filters that filter values of a first attribute according to values of a second attribute for which there is a table that relates values of the first attribute to values of the second attribute may be considered to be general attribute qualification filters. Referring to the example query introduced above, the following filter may be identified as a general attribute qualification filter:
[Page_Category]@[PAGECAT_ID_BIGDEC19] in (3, 4)
because it filters values of the attribute Page according to values of the attribute Page Category and page:page category relationship table 318 relates values of the attribute Page to values of the attribute Page Category.

Relationship filters to be applied also are identified (606). A relationship filter may be considered to be a filter that filters values of an attribute based on a relationship between values of the attribute and values of one or more other attributes, facts, metrics, and/or tables. For example, referring to the example database 300 illustrated in FIG. 3, if it is desired to filter page:page category relationship table 318 to return only those pages that have been assigned to categories that are the same as one of the categories assigned to two particular pages, a query may specify that the following filter be applied:

Filter: [Page_Category] where [Page]@[PAGE_ID_BIGDEC19] in (312, 679)
where "312" and "679" represent the indices of the two particular pages in page lookup table 304. This example filter may be considered to be a relationship filter because it filters values of an attribute based on a relationship between values of the attribute and another attribute (i.e., it filters values of the Page Category attribute according to the values of the Page Category attribute for two particular values of the Page attribute).

Complex filters to be applied also may be identified (608). Filters that cannot be applied in a single table of a table join tree may be considered to be complex filters. One example of a complex filter is a filter that filters values of a first attribute according to values of a second attribute for which there is no single table that relates values of the first attribute to values of the second attribute. Another example of a complex filter is a compound filter in which two or more attribute qualification filters are connected by logical operators other than the conjunctive AND operator, for example, like OR, OR NOT, or AND NOT.

FIG. 7 is a flowchart 406 that illustrates an example of a process for composing a table join tree to facilitate the generation of a response to a query for data recorded in a database based on attributes identified as being relevant to generating the response to the query and filters identified as filters to be applied to values of attributes recorded in the database to facilitate the generation of the response to the query. The process illustrated in the flowchart 406 of FIG. 7 is one example of a process for performing operation 406 of the flowchart 400 of FIG. 4. The process illustrated in the flowchart 406 of FIG. 7 may be performed by a computing system, such as, for example, computing system 102 of FIG. 1.

A determination is made as to whether the output level of the table join tree includes a single attribute and no filters are to be applied (702). In the event that it is determined that the output level of the table join tree includes a single attribute and no filters are to be applied, the lookup table for the single attribute in the output level is selected (704) and the process ends.

Figure 8A:
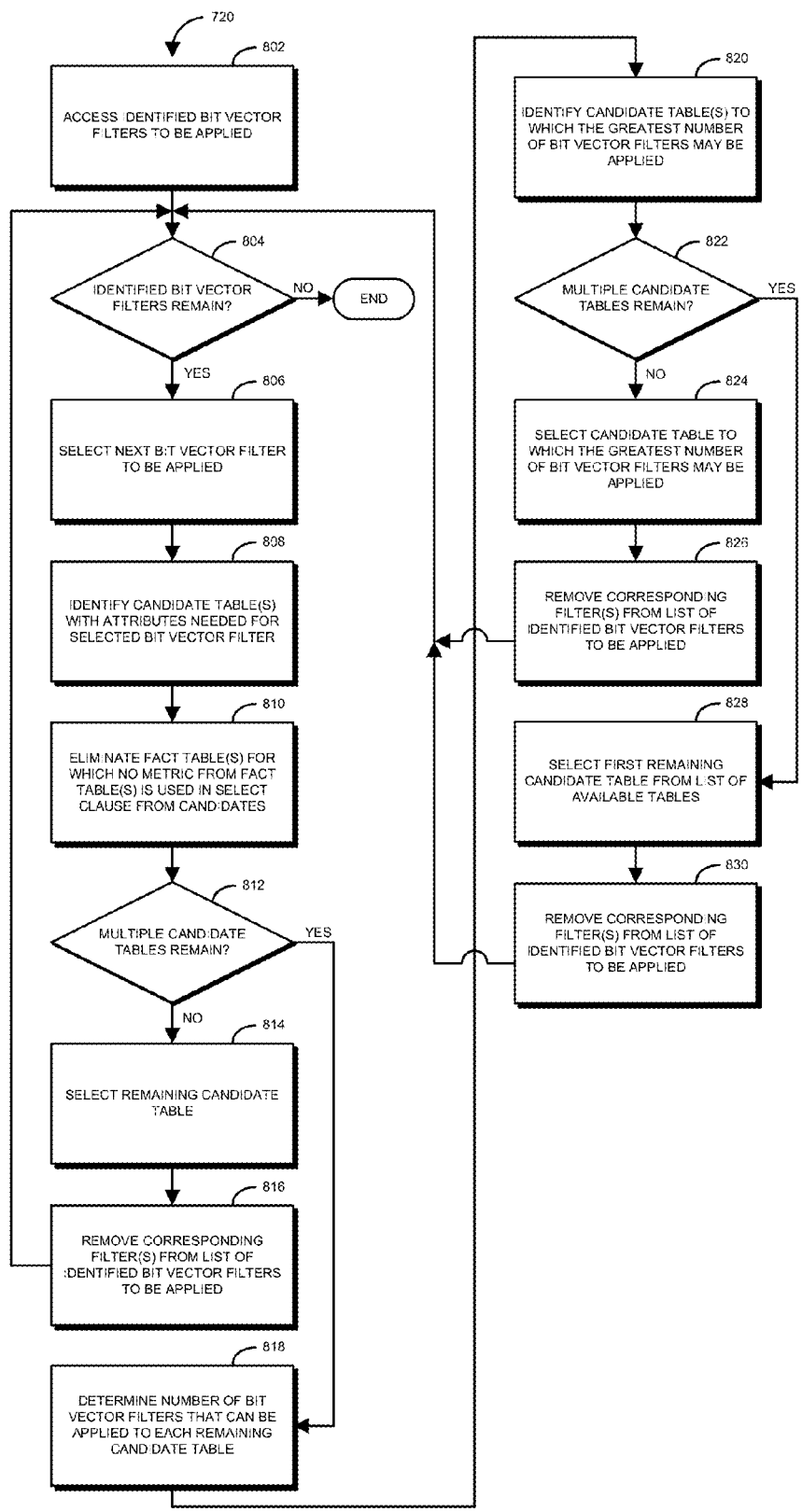
Figure 8B:
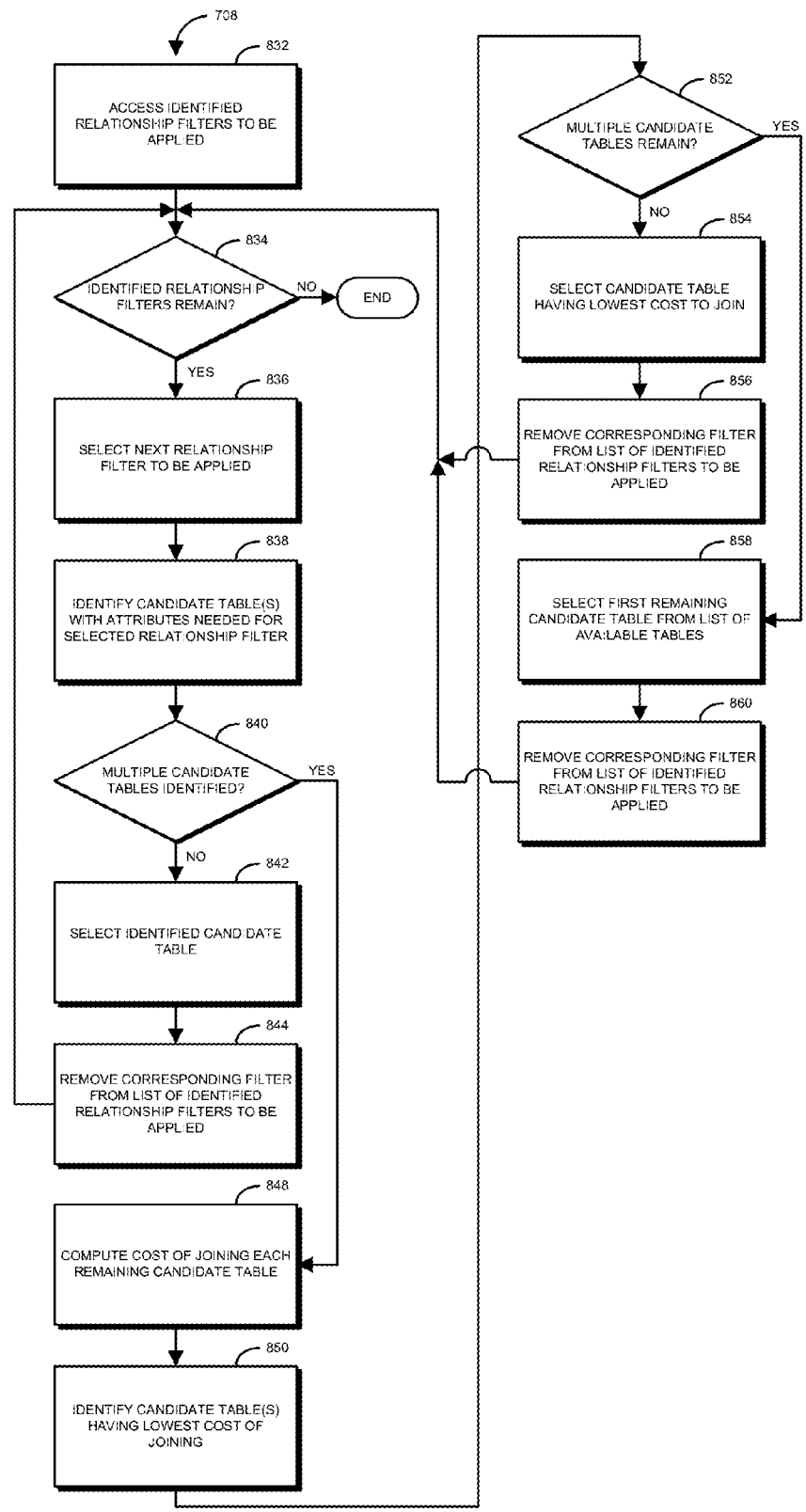

Alternatively, if it is determined that the output level of the table join tree includes multiple attributes and/or that one or more filters are to be applied, a determination is made as to whether any relationship filters are to be applied (706). If no relationship filters are to be applied, the process proceeds to operation 712. Alternatively, if one or more relationship filters are to be applied, tables are selected to enable application of the relationship filters (708). As described in greater detail below, the process illustrated in the flowchart 708 of FIG. 8B is one example of a process for selecting tables to enable application of one or more relationship filters. After the tables that enable application of the relationship filters have been selected, the one or more selected tables are added to the table join tree (710).

Figures 1, 8C:
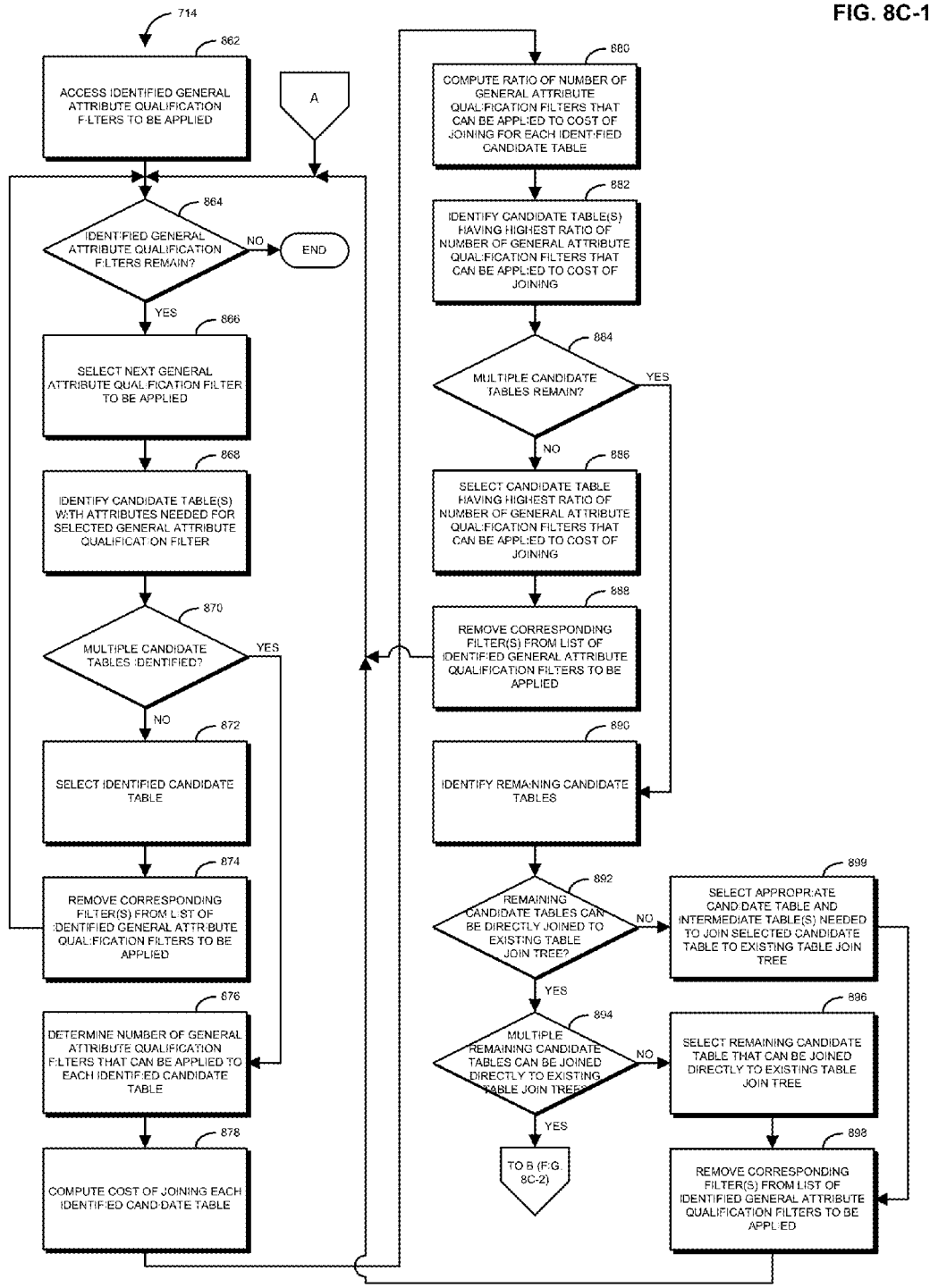
Figures 2, 8C:
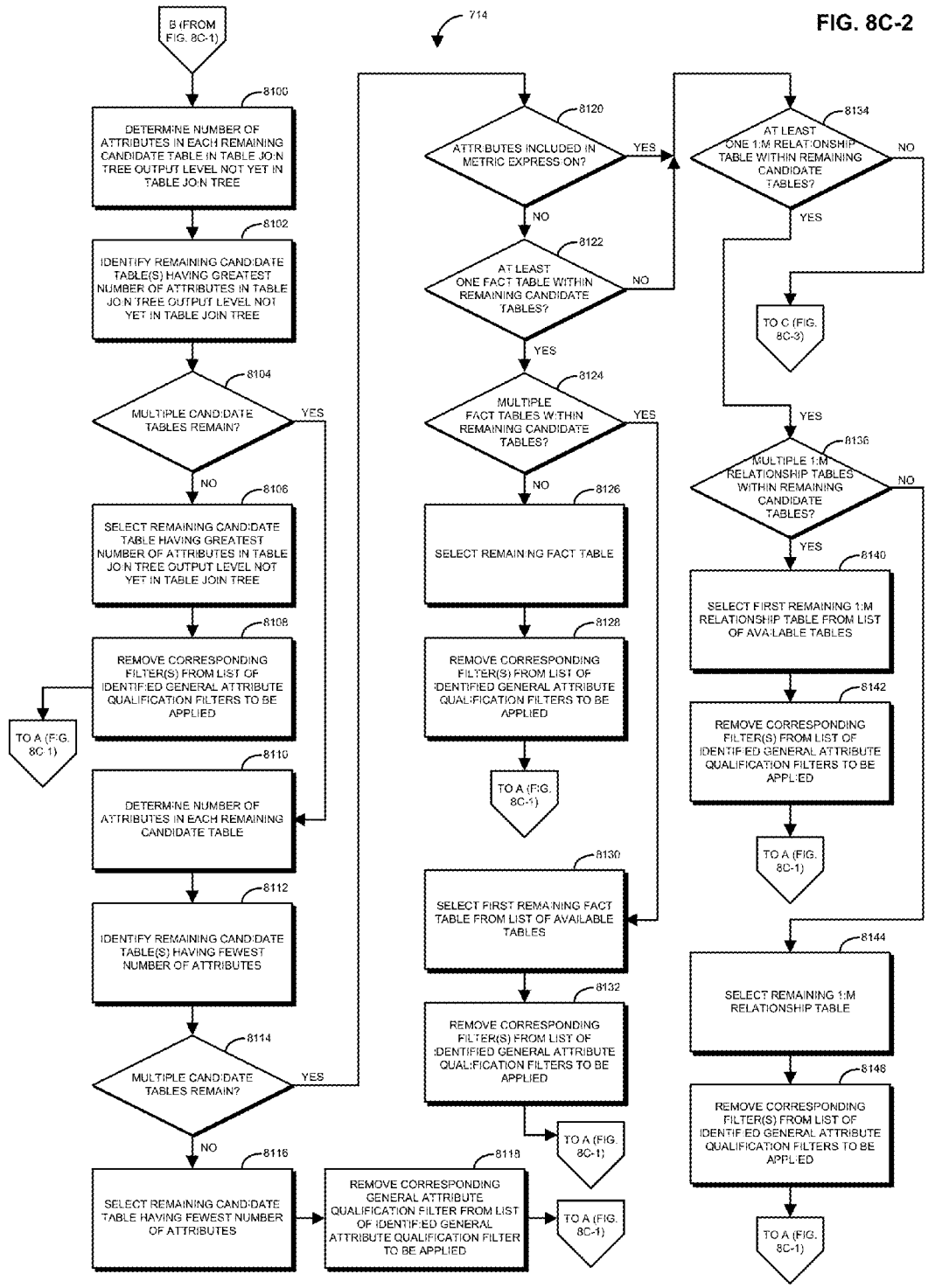

A determination also is made as to whether any general attribute qualification filters are to be applied (712). If no general attribute qualification filters are to be applied, the process proceeds to operation 718. Alternatively, if one or more general attribute qualification filters are to be applied, tables are selected to enable application of the general attribute qualification filters (714). As described in greater detail below, the process illustrated in the flowchart 714 of FIG. 8C is one example of a process for selecting tables to enable application of one or more general attribute qualification filters. After the tables that enable application of the general attribute qualification filters have been selected, the one or more selected tables are added to the table join tree (716).

A determination also is made as to whether any bit vector filters are to be applied (718). If no bit vector filters are to be applied, the process proceeds to operation 726. Alternatively, if one or more bit vector filters are to be applied, tables for applying the bit vector filters are selected and the resultant bit vectors are computed (e.g., as described above) (720). As described in greater detail below, the process illustrated in the flowchart 720 of FIG. 8A is one example of a process for selecting tables to enable application of one or more bit vector filters. In some implementations, when a bit vector filter is executed, the resultant bit vector may be stored for later use. Consequently, some bit vectors may not need to be computed during the generation of the table join tree. Instead, previously computed bit vectors may be reused. After the resultant bit vectors have been computed (or after previously computed bit vectors have been identified), the bit vectors are combined (e.g., ANDed as described above) (722) and the result of combining the bit vectors is added to the table join tree (724).

Figures 1, 8D:
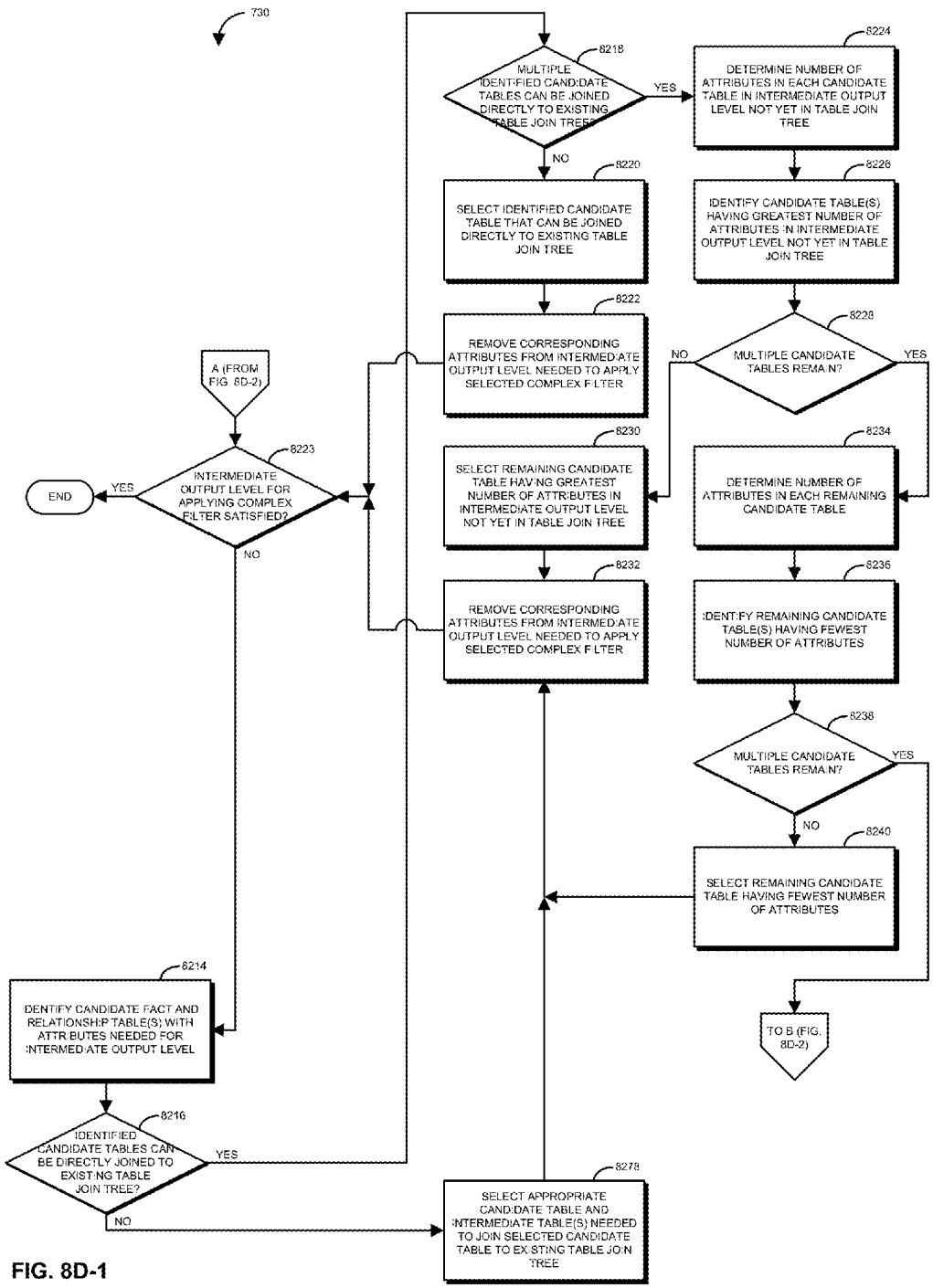
Figures 2, 8D:
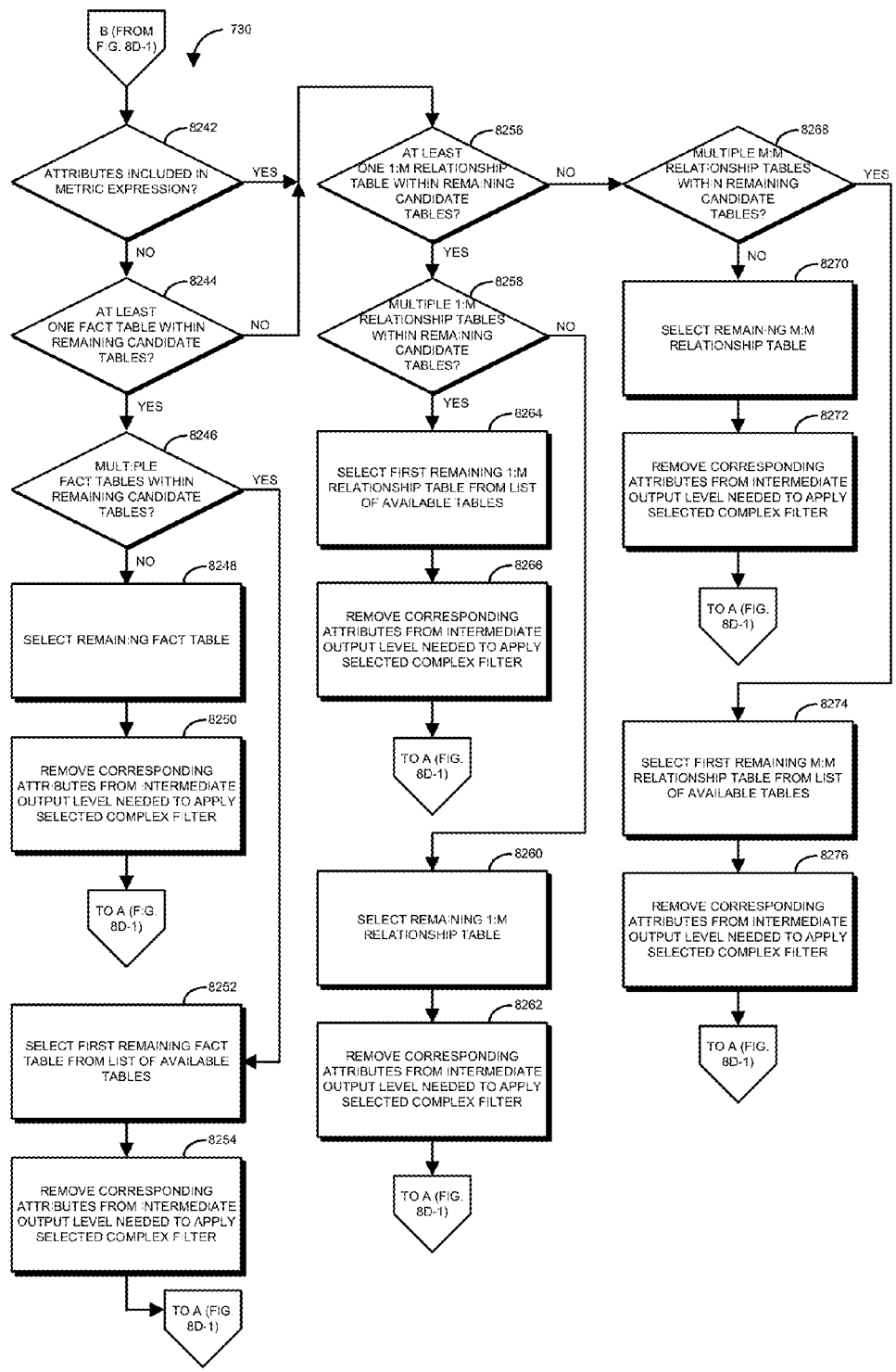

A determination also is made as to whether any complex filters are to be applied (726). If no complex filters are to be applied, the process proceeds to operation 736. Alternatively, if one or more complex filters are to be applied, a determination is made as to whether the intermediate output level necessary for applying the complex filter is satisfied by the existing table join tree (728). If the intermediate output level necessary for applying the complex filter is satisfied by the existing table join tree, the process proceeds to operation 734. Alternatively, if the intermediate output level necessary for applying the complex filter is not satisfied by the existing table join tree, one or more additional tables are selected to join to the table join tree to achieve the intermediate output level necessary for applying the complex filter. As described in greater detail below, the process illustrated in the flowchart 730 of FIG. 8D is one example of a process for selecting tables to achieve the intermediate output level necessary for applying the complex filter. After the tables to achieve the intermediate output level necessary for applying the complex filter have been selected, the one or more selected tables are added to the table join tree (732) and the complex filter is applied at the branch of the table join tree where the intermediate output level was achieved (734).

Figures 1, 8E:
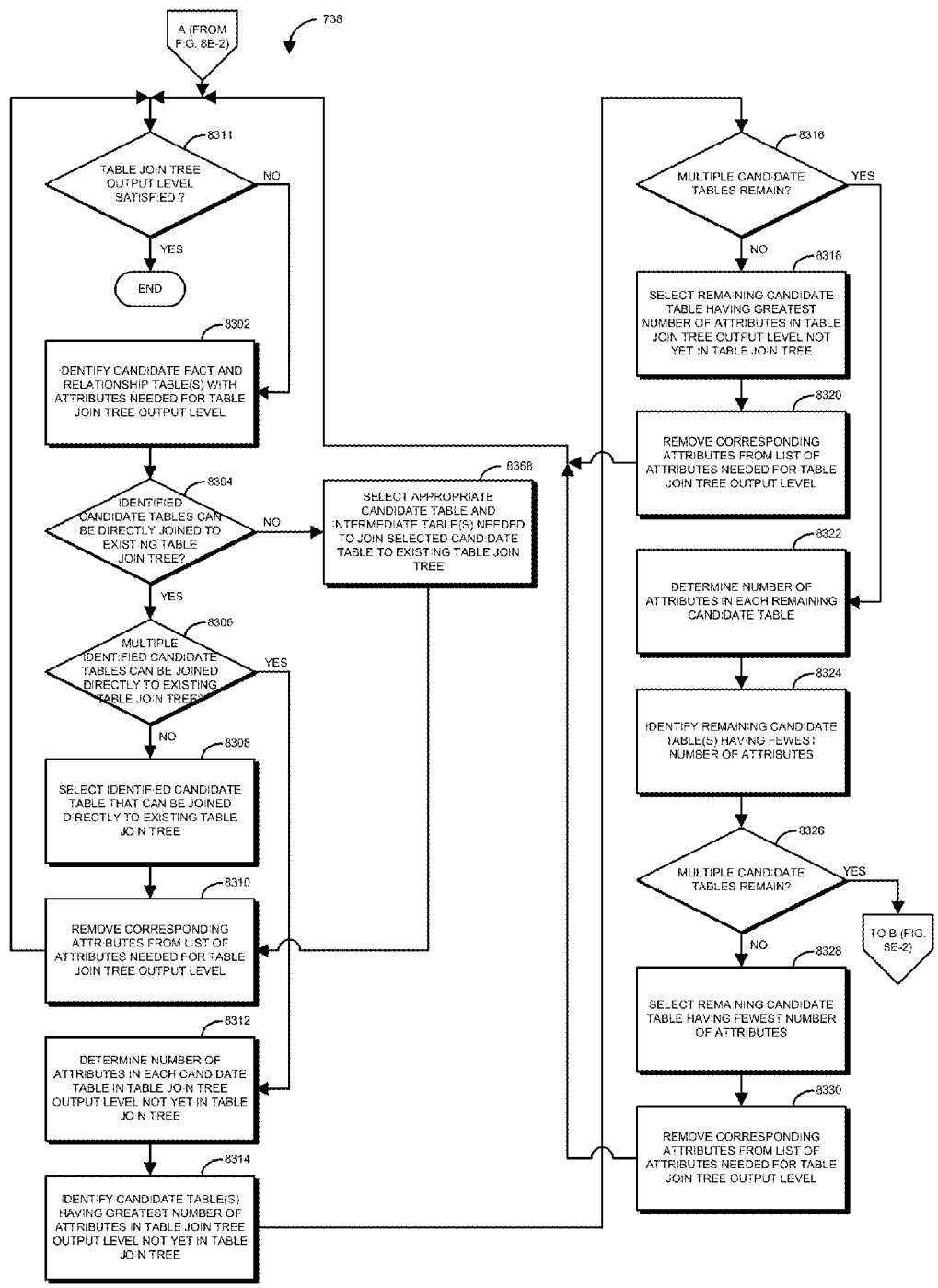
Figures 2, 8E:
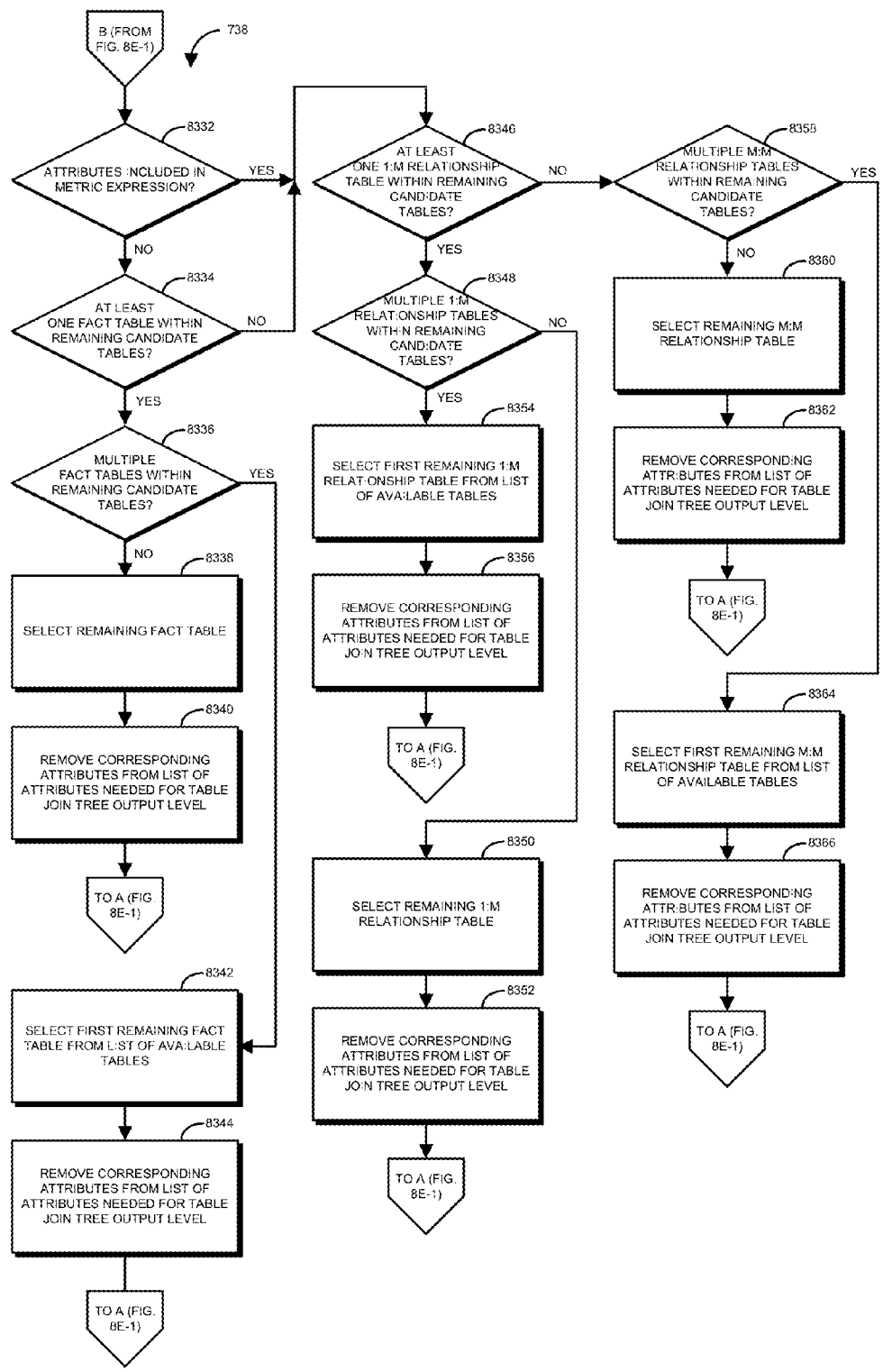

A determination then is made as to whether the output level for the table join tree has been satisfied (736). If the output level for the table join tree has been satisfied, the process ends. Alternatively, if the output level for the table join tree has not yet been satisfied, one or more additional tables are selected to add to the table join tree to achieve the output level of the table join tree (738). As described in greater detail below, the process illustrated in the flowchart 738 of FIG. 8E is one example of a process for selecting tables to add to the table join tree to achieve the output level for the table join tree. The selected tables then are added to the table join tree (740).

FIG. 8A is a flowchart 720 that illustrates an example of a process for selecting tables to enable application of one or more bit vector filters. The process illustrated in the flowchart 720 of FIG. 8A is one example of a process for performing operation 720 of the flowchart 406 of FIG. 7. The process illustrated in the flowchart 720 of FIG. 8A may be performed by a computing system, such as, for example, computing system 102 of FIG. 1.

Indications of the bit vector filters to be applied are accessed (802), and a determination is made as to whether identified bit vector filters remain to be applied (804). If no identified bit vector filters remain, the process ends. Alternatively, if identified bit vector filters remain, the next bit vector filter to be applied is selected (806) and one or more candidate tables with the attributes needed to apply the selected bit vector filter are identified (808). Any fact table for which no metric from the fact table is used in the select clause for the query then is eliminated from the identified candidate tables as a candidate (810).

A determination then is made as to whether multiple candidate tables remain (812). If only a single candidate table remains, the remaining candidate table is selected (814), the bit vector filter(s) that can be applied to the selected table is removed from the list of identified bit vector filters to be applied (816), and the process returns to operation (804). Alternatively, if multiple candidate tables remain, the number of identified bit vector filters that can be applied to each remaining candidate table is determined (818).

One or more candidate tables to which the greatest number of bit vector filters can be applied then are identified (820) and a determination is made as to whether multiple candidate tables still remain (822). If there is only a single table to which the greatest number of bit vector filters may be applied, it is selected (824), the bit vector filters that can be applied to the selected table are removed from the list of identified bit vector filters to be applied (826), and the process returns to operation 804. Alternatively, if there are multiple candidate tables to which the same number of bit vector filters can be applied, then the candidate table that is listed first in the database structure (e.g., database structure 324) is selected (828), the bit vector filter(s) that can be applied to the selected table are removed from the list of identified bit vector filters to be applied (830), and the process returns to operation 804.

In some scenarios, execution of the process illustrated in the flowchart 720 of FIG. 8A may result in no table being identified as a table to which a particular bit vector filter may be applied. In such scenarios, the bit vector filter may be reclassified as a complex filter and appropriate techniques may be applied to enable application of the complex filter as described elsewhere in this disclosure.

FIG. 8B is a flowchart 708 that illustrates an example of a process for selecting tables to enable application of one or more relationship filters. The process illustrated in the flowchart 708 of FIG. 8B is one example of a process for performing operation 708 of the flowchart 406 of FIG. 7. The process illustrated in the flowchart 708 of FIG. 8B may be performed by a computing system, such as, for example, computing system 102 of FIG. 1.

Indications of the relationship filters to be applied are accessed (832) and a determination is made as to whether identified relationship filters remain to be applied (834). If no identified relationship filters remain, the process ends. Alternatively, if relationship filters remain, the next relationship filter to be applied is selected (836) and one or more candidate tables with the attributes needed to apply the selected relationship filter are identified (838).

A determination then is made as to whether multiple candidate tables were identified (840). If only a single candidate table was identified, the single candidate table is selected (814), the relationship filter that can be applied to the selected table is removed from the list of identified relationship filters to be applied (844), and the process returns to operation (834). Alternatively, if multiple candidate tables were identified, a cost of joining each candidate table to the table join tree is computed (848). In some implementations, among relationship tables (e.g., either one-to-many relationship tables or many-to-many relationship tables) and fact tables within a database, one-to-many relationship tables may be assigned a lower cost of joining the table join tree than many-to-many relationship tables, and both one-to-many and many-to-many relationship tables may be assigned lower costs of joining the table join tree than fact tables. Additional or alternative factors also may be considered in computing the cost of joining tables to the table join tree. For example, among other factors, the level(s) of the attribute(s) for which values are recorded in the tables within the hierarchy may be factored into computing the cost of joining tables to the table join tree, the number of rows in the tables may be factored into computing the cost of joining tables to the table join tree, and/or the approximate numbers of rows to be removed from the tables by the filter may be factored into computing the cost of joining tables to the table join tree.

After computing the cost of joining each candidate table to the table join tree, one or more candidate tables having the lowest cost of joining the table join tree are identified (850). A determination then is made as to whether multiple candidate tables remain (852). If only a single candidate table has the lowest cost to join the table join tree, it is selected (854), the relationship filter is removed from the list of identified relationship filters to be applied (856), and the process returns to operation 834. Alternatively, if there are multiple candidate tables having the same cost to join the table join tree, then the candidate table that is listed first in the database structure (e.g., database structure 324) is selected (858), the relationship filter is removed from the list of identified relationship filters to be applied (860), and the process returns to operation 834.

In some scenarios, execution of the process illustrated in the flowchart 708 of FIG. 8B may result in no table being identified as a table to which a particular relationship filter may be applied. In such scenarios, the relationship filter may be reclassified as a complex filter and appropriate techniques may be applied to enable application of the complex filter as described elsewhere in this disclosure.

FIG. 8C is a flowchart 714 that illustrates an example of a process for selecting tables to enable application of one or more general attribute qualification filters. The process illustrated in the flowchart 714 of FIG. 8C is one example of a process for performing operation 714 of the flowchart 406 of FIG. 7. The process illustrated in the flowchart 714 of FIG. 8C may be performed by a computing system, such as, for example, computing system 102 of FIG. 1.

Indications of the general attribute qualification filters to be applied are accessed (862) and a determination is made as to whether identified general attribute qualification filters remain to be applied (864). If no identified general attribute qualification filters remain, the process ends. Alternatively, if general attribute qualification filters remain, the next general attribute qualification filter to be applied is selected (866) and one or more candidate tables with the attributes needed to apply the selected attribute qualification filter are identified (868).

A determination then is made as to whether multiple candidate tables were identified (870). If only a single candidate table was identified, the single candidate table is selected (872), the general attribute qualification filter(s) that can be applied to the selected table is removed from the list of identified general attribute qualification filters to be applied (874), and the process returns to operation (864).

Alternatively, if multiple candidates were identified, the number of identified general attribute qualification filters that can be applied to each remaining candidate table is determined (876). In addition, the cost of joining each remaining candidate table to the table join tree is computed (878). In some implementations, among relationship tables (e.g., either one-to-many relationship tables or many-to-many relationship tables) and fact tables within a database, one-to-many relationship tables may be assigned a lower cost of joining the table join tree than many-to-many relationship tables, and both one-to-many and many-to-many relationship tables may be assigned lower costs of joining the table join tree than fact tables. Additional or alternative factors also may be considered in computing the cost of joining tables to the table join tree. For example, among other factors, the level(s) of the attribute(s) for which values are recorded in the tables within the hierarchy may be factored into computing the cost of joining tables to the table join tree, the number of rows in the tables may be factored into computing the cost of joining tables to the table join tree, and/or the approximate numbers of rows to be removed from the tables by the filter may be factored into computing the cost of joining tables to the table join tree.

Then, for each candidate table, the ratio of the number of general attribute qualification filters that can be applied to the table to the cost of joining the table to the table join tree is computed (880), and one or more tables having the highest ratio are identified (882).

A determination then is made as to whether multiple candidate tables remain (884). If only a single candidate table has the highest ratio, the single candidate table is selected (886), the general attribute qualification filter(s) that can be applied to the selected table is removed from the list of identified general attribute qualification filters to be applied (888), and the process returns to operation (864). Alternatively, if multiple candidate tables remain, the remaining candidate tables are identified (890), and a determination is made as to whether any of the remaining tables can be joined directly to the existing table join tree (892).

If none of the remaining candidate tables can be joined directly to the existing table join tree, an appropriate candidate table is selected from among the remaining candidate tables as are any intermediate tables needed to join the selected candidate table to the existing table join tree (899). In such situations, a variety of different techniques may be employed to select an appropriate candidate table and any corresponding intermediate tables. For example, in some implementations, a join graph may be generated for each individual candidate table where intermediate tables enabling the candidate table to be joined to the existing table join tree are represented as vertices in the join graph, and the costs to join the various different tables are represented as the edges between the vertices in the join graph. A graph analysis algorithm (e.g., the Floyd algorithm) then may be employed to find the lowest cost path to join the candidate table to the existing table join tree. The lowest cost paths for the different candidate tables then may be compared, and the candidate table having the lowest lowest cost path may be selected along with the intermediate tables constituting the lowest cost path.

After the candidate table and any intermediate tables needed to join the selected candidate table to the table join tree have been selected, the general attribute qualification filter(s) that can be applied to the selected table is removed from the list of identified general attribute qualification filters (898), and the process returns to operation 864. Alternatively, if one or more of the remaining candidate tables can be joined directly to the existing table join tree, a determination is made as to whether multiple of the remaining candidate tables can be joined directly to the existing table join tree (894).

If only a single remaining candidate table can be joined directly to the existing table join tree, the single candidate table is selected (896), the general attribute qualification filter(s) that can be applied to the selected table is removed from the list of identified general attribute qualification filters (898), and the process returns to operation 864. Alternatively, if multiple remaining candidate tables can be joined directly to the existing table join tree, the number of attributes in each remaining candidate table that are in the output level for the table join tree but that are not yet in the table join tree are determined (8100), and one or more of the remaining candidate tables are identified as having the greatest number of attributes that are in the output level for the table join tree but that are not yet in the table join tree (8102).

A determination then is made as to whether multiple candidate tables still remain (8104). If only a single candidate table has the greatest number of attributes that are in the output level for the table join tree but that are not yet in the table join tree, then that table is selected (8106), the general attribute qualification filter(s) that can be applied to the selected table is removed from the list of identified general attribute qualification filters (8108), and the process returns to operation 864.

Alternatively, if there are multiple candidate tables having the greatest number of attributes that are in the output level for the table join tree but that are not yet in the table join tree, then the number of attributes in each remaining candidate table is determined (8110), and one or more candidate tables having the fewest numbers of attributes are identified (8112).

A determination then is made as to whether multiple candidate tables remain (8114). If only a single candidate table has the fewest number of attributes, then that table is selected (8116), the general attribute qualification filter(s) that can be applied to the selected table is removed from the list of identified general attribute qualification filters (8118), and the process returns to operation 864.

Alternatively, if multiple candidate tables have the fewest number of attributes, then a determination is made as to whether there are attributes included in the metric expression for the query (8120). If there are no attributes included in the metric expression for the query, a determination is made as to whether there is a fact table within the remaining candidate tables (8122). If there is at least one fact table within the remaining candidate tables, a determination is made as to whether there are multiple fact tables within the remaining candidate tables (8124). If there is only a single fact table within the remaining candidate tables, that table is selected (8126), the general attribute qualification filter(s) that can be applied to the selected table is removed from the list of identified general attribute qualification filters (8128), and the process returns to operation 864. Alternatively, if there are multiple fact tables within the remaining candidate tables, then the candidate fact table that is listed first in the database structure (e.g., database structure 324) is selected (8130), the general attribute qualification filter(s) that can be applied to the selected table is removed from the list of identified general attribute qualification filters (8132), and the process returns to operation 864.

Referring again to operation 8120, if one or more attributes are determined to be in the metric expression, the process proceeds to operation 8134. Similarly, at operation 8122, if no fact tables are determined to remain within the remaining candidate tables, the process proceeds to operation 8134. At operation 8134, a determination is made as to whether at least one one-to-many relationship table remains within the remaining candidate tables (8134).

If at least one one-to-many relationship table is determined to remain within the remaining candidate tables, a determination is made as to whether there are multiple one-to-many relationship tables within the remaining candidate tables (8136). If there is only a single one-to-many relationship table within the remaining candidate tables, that table is selected (8144), the general attribute qualification filter(s) that can be applied to the selected table is removed from the list of identified general attribute qualification filters (8146), and the process returns to operation 864. Alternatively, if there are multiple one-to-many relationship tables within the remaining candidate tables, then the remaining one-to-many relationship table that is listed first in the database structure (e.g., database structure 324) is selected (8140), the general attribute qualification filter(s) that can be applied to the selected table is removed from the list of identified general attribute qualification filters (8142), and the process returns to operation 864.

Referring again to operation 8134, if no one-to-many relationship tables are determined to remain within the remaining candidate tables, the process proceeds to operation 8148, where a determination is made as to whether multiple many-to-many relationship tables remain within the candidate tables (8148). If there is only a single many-to-many relationship table within the remaining candidate tables, that table is selected (8150), the general attribute qualification filter(s) that can be applied to the selected table is removed from the list of identified general attribute qualification filters (8152), and the process returns to operation 864. Alternatively, if there are multiple many-to-many relationship tables within the remaining candidate tables, then the remaining many-to-many relationship table that is listed first in the database structure (e.g., database structure 324) is selected (8154), the general attribute qualification filter(s) that can be applied to the selected table is removed from the list of identified general attribute qualification filters (8156), and the process returns to operation 864.

In some scenarios, execution of the process illustrated in the flowchart 714 of FIG. 8C may result in no table being identified as a table to which a particular general attribute qualification filter may be applied. In such scenarios, the general attribute qualification filter may be reclassified as a complex filter and appropriate techniques may be applied to enable application of the complex filter as described elsewhere in this disclosure.

FIG. 8D is a flowchart 730 that illustrates an example of a process for selecting tables to achieve the intermediate output level necessary for applying a complex filter. The process illustrated in the flowchart 730 of FIG. 8D is one example of a process for performing operation 730 of the flowchart 406 of FIG. 7. The process illustrated in the flowchart 730 of FIG. 8D may be performed by a computing system, such as, for example, computing system 102 of FIG. 1.

Candidate fact and relationship tables with attributes needed for the intermediate output level of the table join tree are identified (8214). Then, a determination is made as to whether the identified candidate tables can be joined directly to the existing table join tree (8216). If none of the candidate tables can be joined directly to the existing table join tree, an appropriate candidate table is selected from among the candidate tables as are any intermediate tables needed to join the selected candidate table to the existing table join tree (8278). In such situations, a variety of different techniques may be employed to select an appropriate candidate table and any corresponding intermediate tables. For example, in some implementations, a join graph may be generated for each individual candidate table where intermediate tables enabling the candidate table to be joined to the existing table join tree are represented as vertices in the join graph, and the costs to join the various different tables are represented as the edges between the vertices in the join graph. A graph analysis algorithm (e.g., the Floyd algorithm) then may be employed to find the lowest cost path to join the candidate table to the existing table join tree. The lowest cost paths for the different candidate tables then may be compared, and the candidate table having the lowest lowest cost path may be selected along with the intermediate tables constituting the lowest cost path.

After the candidate table and any intermediate tables needed to join the selected candidate table to the table join tree have been selected, any attributes needed to achieve the intermediate output level of the table join tree that are included in the selected table are removed (8232), and the process proceeds to operation 8223, where a determination is made as to whether the intermediate output level for applying the complex filter now is satisfied (8223). If so, the process ends. If not, the process returns to operation 8214.

Referring again to operation 8216, if one or more of the identified candidate tables can be joined directly to the existing table join tree, a determination is made as to whether multiple of the candidate tables can be joined directly to the existing table join tree (8218). If only a single one of the candidate tables can be joined directly to the existing table join tree, that table is selected (8220), any attributes needed to achieve the intermediate output level of the table join tree that are included in the selected table are removed (8222), and a determination is made as to whether the intermediate output level for applying the complex filter now is satisfied (8223). If so, the process ends. If not, the process returns to operation 8214.

Alternatively, if multiple candidate tables can be joined directly to the existing table join tree, the number of attributes in each candidate table that are in the intermediate output level for the table join tree but that are not yet in the table join tree are determined (8224). Thereafter, one or more candidate tables are identified as having the greatest number of attributes in the intermediate output level for the table join tree that are not yet in the table join tree (8226).

A determination then is made as to whether multiple candidate tables remain (8228). If only a single candidate table has the greatest number of attributes that are in the intermediate output level for the table join tree but that are not yet in the table join tree, then that table is selected (8230), any attributes needed to achieve the intermediate output level of the table join tree that are included in the selected table are removed (8232), and a determination is made as to whether the intermediate output level for applying the complex filter now is satisfied (8223). If so, the process ends. If not, the process returns to operation 8214.

Alternatively, if multiple candidate tables are determined to have the greatest number of attributes that are in the intermediate output level for the table join tree but that are not yet in the table join tree, the number of attributes in each remaining candidate table is determined (8234), and one or more of the remaining candidate tables are identified as having the fewest number of attributes (8236).

A determination then is made as to whether multiple candidate tables still remain (8238). If only a single candidate table has the fewest number of attributes, that table is selected (8240), any attributes needed to achieve the intermediate output level of the table join tree that are included in the selected table are removed (8232), and a determination is made as to whether the intermediate output level for applying the complex filter now is satisfied (8223). If so, the process ends. If not, the process returns to operation 8214.

Alternatively, if multiple candidate tables have the fewest number of attributes, a determination is made as to whether there are attributes included in the metric expression for the query (8242). If there are no attributes included in the metric expression for the query, a determination is made as to whether there is a fact table within the remaining candidate tables (8244). If there is at least one fact table within the remaining candidate tables, a determination is made as to whether there are multiple fact tables within the remaining candidate tables (8246). If there is only a single fact table within the remaining candidate tables, that table is selected (8248), any attributes needed to achieve the intermediate output level of the table join tree that are included in the selected table are removed (8250), and a determination is made as to whether the intermediate output level for applying the complex filter now is satisfied (8223). If so, the process ends. If not, the process returns to operation 8214.

Alternatively, if there are multiple fact tables within the remaining candidate tables, then the candidate fact table that is listed first in the database structure (e.g., database structure 324) is selected (8252), any attributes needed to achieve the intermediate output level of the table join tree that are included in the selected table are removed (8254), and a determination is made as to whether the intermediate output level for applying the complex filter now is satisfied (8223). If so, the process ends. If not, the process returns to operation 8214.

Referring again to operation 8242, if one or more attributes are determined to be in the metric expression, the process proceeds to operation 8256. Similarly, at operation 8244, if no fact tables are determined to remain within the remaining candidate tables, the process proceeds to operation 8256. At operation 8256, a determination is made as to whether at least one one-to-many relationship table remains within the remaining candidate tables (8256).

If at least one one-to-many relationship table is determined to remain within the remaining candidate tables, a determination is made as to whether there are multiple one-to-many relationship tables within the remaining candidate tables (8258). If there is only a single one-to-many relationship table within the remaining candidate tables, that table is selected (8260), any attributes needed to achieve the intermediate output level of the table join tree that are included in the selected table are removed (8262), and a determination is made as to whether the intermediate output level for applying the complex filter now is satisfied (8223). If so, the process ends. If not, the process returns to operation 8214. Alternatively, if there are multiple one-to-many relationship tables within the remaining candidate tables, then the remaining one-to-many relationship table that is listed first in the database structure (e.g., database structure 324) is selected (8264), any attributes needed to achieve the intermediate output level of the table join tree that are included in the selected table are removed (8266), and a determination is made as to whether the intermediate output level for applying the complex filter now is satisfied (8223). If so, the process ends. If not, the process returns to operation 8214.

Referring again to operation 8256, if no one-to-many relationship tables are determined to remain within the remaining candidate tables, the process proceeds to operation 8268, where a determination is made as to whether multiple many-to-many relationship tables remain within the candidate tables (8256). If there is only a single many-to-many relationship table within the remaining candidate tables, that table is selected (8270), any attributes needed to achieve the intermediate output level of the table join tree that are included in the selected table are removed (8272), and a determination is made as to whether the intermediate output level for applying the complex filter now is satisfied (8223). If so, the process ends. If not, the process returns to operation 8214. Alternatively, if there are multiple many-to-many relationship tables within the remaining candidate tables, then the remaining many-to-many relationship table that is listed first in the database structure (e.g., database structure 324) is selected (8274), any attributes needed to achieve the intermediate output level of the table join tree that are included in the selected table are removed (8276), and a determination is made as to whether the intermediate output level for applying the complex filter now is satisfied (8223). If so, the process ends. If not, the process returns to operation 8214.

FIG. 8E is a flowchart 738 that illustrates an example of a process for selecting tables to add to the table join tree to achieve the output level for the table join tree. The process illustrated in the flowchart 738 of FIG. 8E is one example of a process for performing operation 738 of the flowchart 406 of FIG. 7. The process illustrated in the flowchart 738 of FIG. 8E may be performed by a computing system, such as, for example, computing system 102 of FIG. 1.

Candidate fact and relationship tables with attributes needed for the output level of the table join tree are identified (8302). Then, a determination is made as to whether the identified candidate tables can be joined directly to the existing table join tree (8304). If none of the candidate tables can be joined directly to the existing table join tree, an appropriate candidate table is selected from among the candidate tables as are any intermediate tables needed to join the selected candidate table to the existing table join tree (8368). In such situations, a variety of different techniques may be employed to select an appropriate candidate table and any corresponding intermediate tables. For example, in some implementations, a join graph may be generated for each individual candidate table where intermediate tables enabling the candidate table to be joined to the existing table join tree are represented as vertices in the join graph, and the costs to join the various different tables are represented as the edges between the vertices in the join graph. A graph analysis algorithm (e.g., the Floyd algorithm) then may be employed to find the lowest cost path to join the candidate table to the existing table join tree. The lowest cost paths for the different candidate tables then may be compared, and the candidate table having the lowest lowest cost path may be selected along with the intermediate tables constituting the lowest cost path.

After the candidate table and any intermediate tables needed to join the selected candidate table to the table join tree have been selected, any attributes needed to achieve the output level of the table join tree that are included in the selected table are removed (8310), and a determination is made as to whether the output level for the table join tree now is satisfied (8311). If so, the process ends. If not, the process returns to operation 8302.

Referring again to operation 8304, if one or more of the identified candidate tables can be joined directly to the existing table join tree, a determination is made as to whether multiple of the candidate tables can be joined directly to the existing table join tree (8306). If only a single one of the candidate tables can be joined directly to the existing table join tree, that table is selected (8308), any attributes needed to achieve the output level of the table join tree that are included in the selected table are removed (8310), and a determination is made as to whether the output level for the table join tree now is satisfied (8311). If so, the process ends. If not, the process returns to operation 8302.

Alternatively, if multiple candidate tables can be joined directly to the existing table join tree, the number of attributes in each candidate table that are in the output level for the table join tree but that are not yet in the table join tree are determined (8312). Thereafter, one or more candidate tables are identified as having the greatest number of attributes in the output level for the table join tree that are not yet in the table join tree (8314).

A determination then is made as to whether multiple candidate tables remain (8316). If only a single candidate table has the greatest number of attributes that are in the output level for the table join tree but that are not yet in the table join tree, then that table is selected (8318), any attributes needed to achieve the output level of the table join tree that are included in the selected table are removed (8320), and a determination is made as to whether the output level for the table join tree now is satisfied (8311). If so, the process ends. If not, the process returns to operation 8302.

Alternatively, if multiple candidate tables are determined to have the greatest number of attributes that are in the output level for the table join tree but that are not yet in the table join tree, the number of attributes in each remaining candidate table are determined (8322), and one or more of the remaining candidate tables are identified as having the fewest number of attributes (8324).

A determination then is made as to whether multiple candidate tables still remain (8326). If only a single candidate table has the fewest number of attributes, that table is selected (8328), any attributes needed to achieve the output level of the table join tree that are included in the selected table are removed (8330), and a determination is made as to whether the output level for the table join tree now is satisfied (8311). If so, the process ends. If not, the process returns to operation 8302.

Alternatively, if multiple candidate tables have the fewest number of attributes, a determination is made as to whether there are attributes included in the metric expression for the query (8332). If there are no attributes included in the metric expression for the query, a determination is made as to whether there is a fact table within the remaining candidate tables (8334). If there is at least one fact table within the remaining candidate tables, a determination is made as to whether there are multiple fact tables within the remaining candidate tables (8336). If there is only a single fact table within the remaining candidate tables, that table is selected (8338), any attributes needed to achieve the output level of the table join tree that are included in the selected table are removed (8340), and a determination is made as to whether the output level for the table join tree now is satisfied (8311). If so, the process ends. If not, the process returns to operation 8302.

Alternatively, if there are multiple fact tables within the remaining candidate tables, then the candidate fact table that is listed first in the database structure (e.g., database structure 324) is selected (8342), any attributes needed to achieve the output level of the table join tree that are included in the selected table are removed (8340), and a determination is made as to whether the output level for the table join tree now is satisfied (8311). If so, the process ends. If not, the process returns to operation 8302.

Referring again to operation 8332, if one or more attributes are determined to be in the metric expression, the process proceeds to operation 8346. Similarly, at operation 8334, if no fact tables are determined to remain within the remaining candidate tables, the process proceeds to operation 8346. At operation 8346, a determination is made as to whether at least one one-to-many relationship table remains within the remaining candidate tables (8346).

If at least one one-to-many relationship table is determined to remain within the remaining candidate tables, a determination is made as to whether there are multiple one-to-many relationship tables within the remaining candidate tables (8350). If there is only a single one-to-many relationship table within the remaining candidate tables, that table is selected (8354), any attributes needed to achieve the output level of the table join tree that are included in the selected table are removed (8352), and a determination is made as to whether the output level for the table join tree now is satisfied (8311). If so, the process ends. If not, the process returns to operation 8302. Alternatively, if there are multiple one-to-many relationship tables within the remaining candidate tables, then the remaining one-to-many relationship table that is listed first in the database structure (e.g., database structure 324) is selected (8354), any attributes needed to achieve the output level of the table join tree that are included in the selected table are removed (8356), and a determination is made as to whether the output level for the table join tree now is satisfied (8311). If so, the process ends. If not, the process returns to operation 8302.

Referring again to operation 8346, if no one-to-many relationship tables are determined to remain within the remaining candidate tables, the process proceeds to operation 8358, where a determination is made as to whether multiple many-to-many relationship tables remain within the candidate tables (8358). If there is only a single many-to-many relationship table within the remaining candidate tables, that table is selected (8360), any attributes needed to achieve the output level of the table join tree that are included in the selected table are removed (8362), and a determination is made as to whether the output level for the table join tree now is satisfied (8311). If so, the process ends. If not, the process returns to operation 8302. Alternatively, if there are multiple many-to-many relationship tables within the remaining candidate tables, then the remaining many-to-many relationship table that is listed first in the database structure (e.g., database structure 324) is selected (8364), any attributes needed to achieve the output level of the table join tree that are included in the selected table are removed (8366), and a determination is made as to whether the output level for the table join tree now is satisfied (8311). If so, the process ends. If not, the process returns to operation 8302.

Consider again the example database 300 described above in connection with FIG. 3 and the example view 206 of data recorded in database 300 presented in user interface 200 of FIG. 2C. As discussed above, database 300 may be queried in order to present the view 206 of the data recorded in database 300 that is illustrated in the user interface 200 of FIG. 2C. As further discussed above, such a query may look something like:

Filter: [Current Country]@[USER_COUNTRY_ID] in (257)
   AND [Education Level]@[EDUCATION_LEVEL_ID] in (1, 2)
   AND [Page_Category]@[PAGECAT_ID_BIGDEC19] in (3, 4)
select [Page_Category]@[PAGECAT_ID_BIGDEC19],
   [Page]@[PAGE_ID_BIGDEC19],
   count ([User]@[FAN_ID_BIGDEC19])@{[Page]} as [Fans],
   sum([Table9.NumberComments])@{[Page]} as [Number Comments],
   sum([Table10.NumberVisits])@{[Page]} as [Number Check-Ins]
where "257" represents the index of the country "United Kingdom" in country lookup table 306, "1" represents the index of the education level "High School" in education level lookup table 308, "2" represents the index of the education level "College" in education level lookup table 308, "3" represents the index of the page category "Bar" in page category lookup table 310, and "4" represents the index of the page category "Club" in page category lookup table 310. An example of a process for generating a table join tree to facilitate the generation of a response to such a query now is described making reference to FIG. 9, which is a schematic diagram of an example of a table join tree to facilitate the generation of a response to such a query.

As described above in connection with FIG. 5, the output level for the table join tree may be determined to include the attributes User, Page, and Page Category. In addition, as described above in connection with FIG. 6, two bit vector filters and one general attribute qualification filter may be identified as filters to be applied within the table join tree. More particularly, a first bit vector filter to filter the users by users who live in the United Kingdom, a second bit vector filter to filter the users by users who have an education level of high school or college, and a general attribute qualification filter to filter pages by pages who have been assigned to the category "Bar" or the category "Club" may be determined as filters to be applied within the table join tree.

Figure 9:
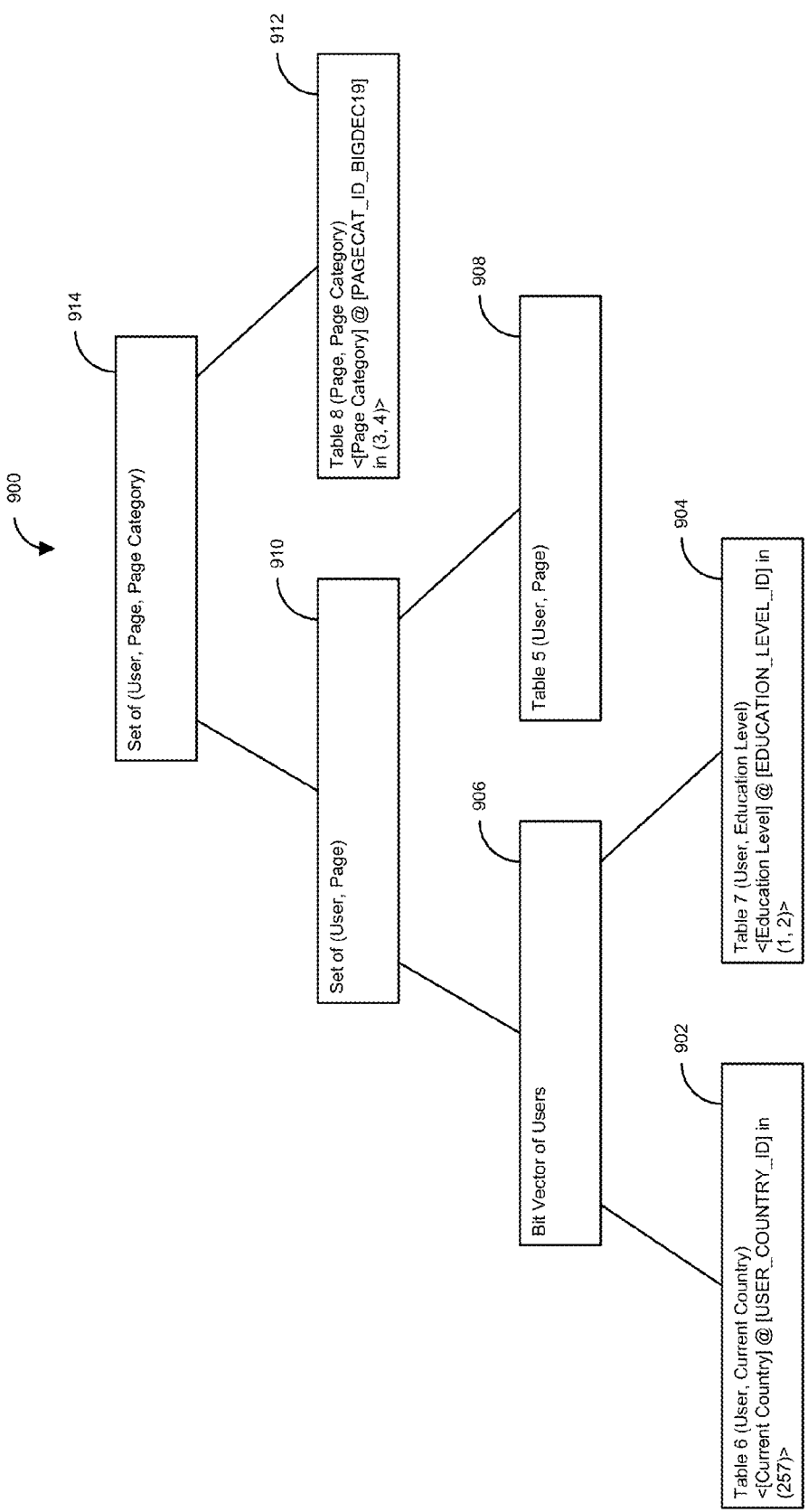
FIGS. 9 and 10 are schematic diagrams of table join trees.

Referring now to FIG. 9 and applying the example process illustrated in the flowchart 406 of FIG. 7, one example of a table join tree to facilitate generation of a response to the query introduced above constructed based on the identified output level and filters to be applied is illustrated. Applying the example process of selecting tables to enable application of bit vector filters illustrated in the flowchart 720 of FIG. 8A, a first leaf 902 of table join tree 900 is formed by selecting user:country relationship table 314 to enable application of a bit vector filter to filter users by users who live in the United Kingdom, and a second leaf 904 of table join tree 900 is formed by selecting user:education level relationship table 316 to filter users by users who have an education level of either high school or college. At node 906 of table join tree 900, a bit vector on user lookup table 302 of users who live in the United Kingdom and who have an education level of either high school or college is generated by combining (e.g., ANDing) the bit vector of users generated by applying the bit vector filter of leaf 902 and the bit vector of users generated by applying the bit vector filter of leaf 904.

Applying the example process of selecting a table to enable application of a general attribute qualification filter illustrated in the flowchart 714 of FIG. 8C, page:page category relationship table 318 then is selected and filtered by pages having either the category "Bar" or "Club." At this point, however, the attributes Page and Page Category cannot be joined to table join tree 900. Consequently, at leaf 908, user:page lookup table 312 is selected to be joined to the table join tree 900, resulting in node 910, where the attributes User and Page now are available. The filtered page:page category relationship table 318 then becomes leaf 912 and is joined to the table join tree 900 at node 914.

At this point, tables have been selected to enable application of all three identified filters and the desired output level for table join tree 900 has been achieved. Consequently, table join tree 900 may be considered to be complete. The table join tree 900 then can be used to generate a response to the query. For example, the table join tree may be incorporated within the query as illustrated in the example below:

select [Page_Category]@[PAGECAT_ID_BIGDEC19],
   [Page]@[PAGE_ID_BIGDEC19],
   count ([User]@[User_ID_BIGDEC19])@{[Page]} as [Fans],
   sum([Table9.NumberComments])@{[Page]} as [Number Comments],
   sum([Table10.NumberVisits])@{[Page]} as [Number Check-Ins]
from in memory database
with Table Join Tree:
   (Set of Tuple([User]@[USER_ID_BIGDEC19]) where Tuple([User]@[USER_ID_BIGDEC19]) in (Shared Bitvector Filter as Set of Tuple([User]@[USER_ID_BIGDEC19]) where Tuple([User]@[USER_ID_BIGDEC19]) in Table6<[Current Country]@[USER_COUNTRY_ID] in (257)>) and (Shared Bitvector Filter as Set of Tuple([User]@[USER_ID_BIGDEC19]) where Tuple([User]@[USER_ID_BIGDEC19]) in Table7<[Education Level]@[education_level_id] in (1, 2)>))

Join Table5 with output level Tuple([User]@[USER_ID_BIGDEC19], [Page]@[PAGE_ID_BIGDEC19])

Join Table8<[Page_Category]@[PAGECAT_ID_BIGDEC19] in (3, 4)> with output level Tuple([User]@[User_ID_BIGDEC19], [Page]@[PAGE_ID_BIGDEC19], [Page_Category]@[PAGECAT_ID_BIGDEC19])

As described above, in some implementations, bit vectors may be reused after being computed for the first time. As such, in the example table join tree presented above, the reference to "Shared Bitvector Filter as ..." may refer to such a bit vector that is reused (e.g., after previously being updated to generate one or more of the views 202, 204 of data recorded in database 300 illustrated in user interface 200 of FIG. 2C).

Execution of the table join tree 900 (e.g., joining selected tables (for instance using inner joins) and applying filters to tables and/or at branches as specified by the table join tree 900) may result in a new table that records values of attributes that are relevant to generating a response to the query and/or that operate as keys into one or more fact tables where data is recorded that is relevant to generating a response to the query. As such, a response to the query may be generated using such a new table resulting from the execution of the table join tree 900.

As another example, consider the example query illustrated in the snippet below:

Filter: [Page_Category] where [Page]@[PAGE_ID_BIGDEC19] in (312, 679)

AND ([Current Country]@[USER_COUNTRY_ID] in (257) OR NOT [Education Level]@[education_level_id] in (1, 2))

select [Page_Category]@[PAGECAT_ID_BIGDEC19],
  [Page]@[PAGE_ID_BIGDEC19],
  count([User]@[USER_ID_BIGDEC19])@{[Page]} as [Fans],
  sum([Table9.NumberComments])@{[Page]} as [Number Comments],
  sum([Table10.NumberVisits])@{[Page]} as [Number Check-Ins]

where "312" and "679" represent the indices of two pages in page lookup table 304. An example of a process for generating a table join tree to facilitate the generation of a response to such a query now is described making reference to FIG. 10, which is a schematic diagram of an example of a table join tree to facilitate the generation of a response to such a query.

The output level for the table join tree may be determined to include the attributes User, Page, and Page Category. In addition, one relationship filter and one complex filter may be identified as filters to be applied within the table join tree. More particularly, a relationship filter that filters values of the attribute Page Category by pages having the same category as the pages with indices "312" and "679" in page lookup table 304 and a complex filter that filters users by users who live in the United Kingdom or who do not have education levels of either high school or college may be determined as filters to be applied within the table join tree.

Figure 10:
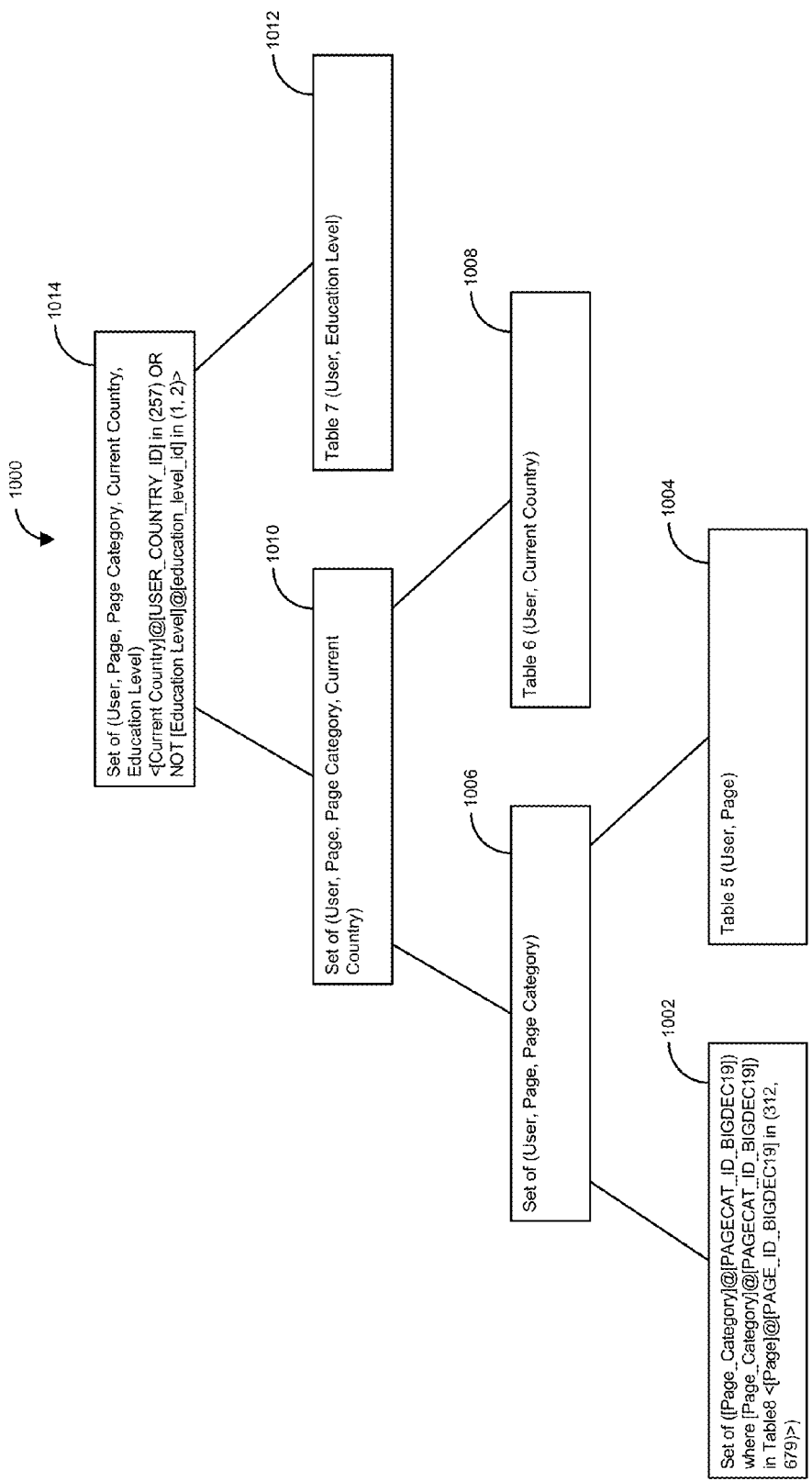

Referring now to FIG. 10 and applying the example process illustrated in the flowchart 406 of FIG. 7, one example of a table join tree to facilitate generation of a response to the query introduced above constructed based on the identified output level and filters to be applied is illustrated. Applying the example process of selecting tables to enable application of relationship filters illustrated in the flowchart 708 of FIG. 8B, a first leaf 1002 of table join tree 1000 is formed by selecting page:page category relationship table 318 and applying the specified relationship filter.

As illustrated in FIG. 10, the attributes User, Current Country, and Education Level are not available at node 1002. Consequently, applying the example process illustrated in the flowchart 730 of FIG. 8D, additional tables are selected to be joined to the table join tree 1000 to achieve the intermediate output level necessary for applying the complex filter. In particular, at leaf 1004, user:page relationship table 312 is selected and joined to the table join tree 1000 at node 1006. Similarly, at leaf 1008, user:country relationship table 314 is selected and joined to the table join tree at node 1010. Lastly, at leaf 1012, user:education level relationship table 316 is selected and joined to the table join tree at node 1014. Consequently, the attributes needed to apply the complex filter are available at node 1014. As such, the complex filter is applied at this branch.

At this point, tables have been selected to enable application of the two identified filters and the desired output level for table join tree 1000 has been achieved. Consequently, table join tree 1000 may be considered to be complete. The table join tree 1000 then can be used to generate a response to the query. For example, the table join tree may be incorporated within the query as illustrated in the example below:

select [Page_Category]@[PAGECAT_ID_BIGDEC19],
  [Page]@[PAGE_ID_BIGDEC19],
  count([User]@[User_ID_BIGDEC19])@{[Page]} as [Fans],
  sum([Table9.NumberComments])@{[Page]} as [Number Comments],
  sum([Table10.NumberVisits])@{[Page]} as [Number Check-Ins]
from in memory database
with Table Join Tree:
  Set of Tuple ([Page_Category]@[PAGECAT_ID_BIGDEC19]) where Tuple ([Page_Category]@[PAGECAT_ID_BIGDEC19]) in Table8<[Page]@[PAGE_ID_BIGDEC19] in (312, 679)>)
  Join Table5 with output level Tuple([User]@[USER_ID_BIGDEC19], [Page]@[PAGE_ID_BIGDEC19], [Page_Category]@[PAGECAT_ID_BIGDEC19])
  Join Table6 with output level Tuple([User]@[USER_ID_BIGDEC19], [Page]@[PAGE_ID_BIGDEC19], [Page_Category]@[PAGECAT_ID_BIGDEC19], [Current Country]@[USER_COUNTRY_ID])
  Join Table7 with output level Tuple ([User]@[USER_ID_BIGDEC19], [Page]@[PAGE_ID_BIGDEC19], [Page_Category]@[PAGECAT_ID_BIGDEC19])<[Current Country]@[USER_COUNTRY_ID] in (257) OR NOT [Education Level]@[education_level_id] in (1, 2)>

Execution of the table join tree 1000 (e.g., joining selected tables (for instance using inner joins) and applying filters to tables and/or at branches as specified by the table join tree 1000) may result in a new table that records values of attributes that are relevant to generating a response to the query and/or that operate as keys into one or more fact tables where data is recorded that is relevant to generating a response to the query. As such, a response to the query may be generated using such a new table resulting from the execution of the table join tree 1000.

A number of methods, techniques, systems, and apparatuses have been described. Nevertheless, various modifications may be made without departing from the scope of this disclosure.

The methods, techniques, systems, and apparatuses described herein may be implemented in digital electronic circuitry or computer hardware, for example, by executing instructions stored in tangible computer-readable storage media.

Apparatuses implementing these techniques may include appropriate input and output devices, a computer processor, and/or tangible computer-readable storage media storing instructions for execution by a processor.

A process implementing techniques disclosed herein may be performed by a processor executing instructions stored on a tangible computer-readable storage medium for performing desired functions by operating on input data and generating appropriate output. Suitable processors include, by way of example, both general and special purpose microprocessors. Suitable computer-readable storage devices for storing executable instructions include all forms of non-volatile memory, including, by way of example, semiconductor memory devices, such as Erasable Programmable Read-Only Memory (EPROM), Electrically Erasable Programmable Read-Only Memory (EEPROM), and flash memory devices; magnetic disks such as fixed, floppy, and removable disks; other magnetic media including tape; and optical media such as Compact Discs (CDs) or Digital Video Disks (DVDs). Any of the foregoing may be supplemented by, or incorporated in, specially designed application-specific integrated circuits (ASICs).

Although the operations of the disclosed techniques may be described herein as being performed in a certain order and/or in certain combinations, in some implementations, individual operations may be rearranged in a different order, combined with other operations described herein, and/or eliminated, and desired results still may be achieved. Similarly, components in the disclosed systems may be combined in a different manner and/or replaced or supplemented by other components and desired results still may be achieved.

What is claimed is:

1. A computer-implemented method comprising:
receiving a query related to data stored in a database that is implemented in computer memory and that includes multiple different tables, where individual ones of the tables include values for attributes of data stored in the database;
based on the received query, identifying attributes of data stored in the database that are relevant to generating a response to the received query;
accessing information that is indicative of attributes for which values are included in the different tables included in the database;
identifying tables included in the database that include values for the attributes identified as being relevant to generating a response to the received query based on having accessed the information indicative of the attributes for which values are included in the different tables included in the database includes:
   selecting a first attribute from among the attributes identified as being relevant to generating a response to the received query,
   based on having accessed the information indicative of the attributes for which values are included in the different tables included in the database, identifying a first table included in the database that includes values for the first attribute,
   selecting a second attribute from among the attributes identified as being relevant to generating a response to the received query, where the second attribute is different from the first attribute and values for the second attribute are not included in the first table, and
   based on having accessed the information indicative of the attributes for which values are included in the different tables included in the database, identifying a second table included in the database that includes values for the second attribute includes:
      identifying a second table included in the database that includes values for the second attribute that cannot be joined directly to the first table, and
      based on having accessed the information indicative of the attributes for which values are included in the different tables included in the database, identifying at least one intermediate table for joining the second table to the first table from among the tables included in the database; and
joining tables included in the database identified as including values for attributes identified as being relevant to generating a response to the received query to create, within computer memory, a new table that reflects relationships between values of attributes identified as being relevant to generating a response to the received query includes joining the first and second tables to create a new table that reflects relationships between values of the first attribute and values of the second attribute includes:
   joining the at least one intermediate table to the first table to create an intermediary table, and
   joining the second table to the intermediary table to create the new table that reflects relationships between values of the first attribute and values of the second attribute.

2. A computer-implemented method comprising:
receiving a query related to data stored in a database that is implemented in computer memory and that includes multiple different tables, where individual ones of the tables include values for attributes of data stored in the database;
based on the received query, identifying attributes of data stored in the database that are relevant to generating a response to the received query;
accessing information that is indicative of attributes for which values are included in the different tables included in the database;
identifying tables included in the database that include values for the attributes identified as being relevant to generating a response to the received query based on having accessed the information indicative of the attributes for which values are included in the different tables included in the database includes:
   selecting a first attribute from among the attributes identified as being relevant to generating a response to the received query,
   based on having accessed the information indicative of the attributes for which values are included in the different tables included in the database, identifying a first table included in the database that includes values for the first attribute,
   selecting a second attribute from among the attributes identified as being relevant to generating a response to the received query, where the second attribute is different from the first attribute and values for the second attribute are not included in the first table, and identifying a second table included in the database that includes values for the second attribute based on having accessed the information indicative of the attributes for which values are included in the different tables included in the database includes:
  based on having accessed the information indicative of the attributes for which values are included in the different tables included in the database, identifying multiple tables included in the database that include values for the second attribute;
  determining that a particular one of the multiple tables identified as tables that include values for the second attribute can be joined directly to the first table; and
  selecting the particular table as the second table; and
joining tables included in the database identified as including values for attributes identified as being relevant to generating a response to the received query to create, within computer memory, a new table that reflects relationships between values of attributes identified as being relevant to generating a response to the received query includes joining the first and second tables to create a new table that reflects relationships between values of the first attribute and values of the second attribute.

3. The method of claim 2 wherein:
determining that a particular one of the multiple tables identified as tables that include values for the second attribute can be joined directly to the first table includes determining that the particular table is the only one of the multiple tables identified as tables that include values for the second attribute that can be joined directly to the first table; and
selecting the particular table as the second table includes selecting the particular table as the second table as a consequence of having determined that the particular table is the only one of the multiple tables identified as tables that include values for the second attribute that can be joined directly to the first table.

4. A computer-implemented method comprising:
receiving a query related to data stored in a database that is implemented in computer memory and that includes multiple different tables, where individual ones of the tables include values for attributes of data stored in the database;
based on the received query, identifying attributes of data stored in the database that are relevant to generating a response to the received query;
accessing information that is indicative of attributes for which values are included in the different tables included in the database;
identifying tables included in the database that include values for the attributes identified as being relevant to generating a response to the received query based on having accessed the information indicative of the attributes for which values are included in the different tables included in the database includes:
  selecting a first attribute from among the attributes identified as being relevant to generating a response to the received query,
  based on having accessed the information indicative of the attributes for which values are included in the different tables included in the database, identifying a first table included in the database that includes values for the first attribute,
  selecting a second attribute from among the attributes identified as being relevant to generating a response to the received query, where the second attribute is different from the first attribute and values for the second attribute are not included in the first table, and
  identifying a second table included in the database that includes values for the second attribute based on having accessed the information indicative of the attributes for which values are included in the different tables included in the database includes:
    based on having accessed the information indicative of the attributes for which values are included in the different tables included in the database, identifying multiple tables included in the database that include values for the second attribute;
    identifying, from among the multiple tables identified as tables that include values for the second attribute, multiple tables as tables that can be joined directly to the first table;
    determining, for each table identified as a table that includes values for the second attribute that can be joined directly to the first table, a number of attributes identified as being relevant to generating a response to the received query for which values are included in the table other than the second attribute and any attributes identified as being relevant to generating a response to the received query for which values are included in the first table;
    based on having determined, for each table identified as a table that includes values for the second attribute that can be joined directly to the first table, the number of attributes identified as being relevant to generating a response to the received query for which values are included in the table other than the second attribute and any attributes identified as being relevant to generating a response to the received query for which values are included in the first table, determining that a particular one of the tables identified as tables that include values for the second attribute that can be joined directly to the first table includes values for more attributes identified as being relevant to generating a response to the received query other than the second attribute and any attributes identified as being relevant to generating a response to the received query for which values are included in the first table than any of the other tables identified as tables that include values for the second attribute that can be joined directly to the first table; and
    selecting the particular table as the second table as a consequence of having determined that the particular table includes values for more attributes identified as being relevant to generating a response to the received query other than the second attribute and any attributes identified as being relevant to generating a response to the received query for which values are included in the first table than any of the other tables identified as tables that include values for the second attribute that can be joined directly to the first table; and
joining tables included in the database identified as including values for attributes identified as being relevant to generating a response to the received query to create, within computer memory, a new table that reflects relationships between values of attributes identified as being relevant to generating a response to the received query includes joining the first and second tables to create a new table that reflects relationships between values of the first attribute and values of the second attribute.

5. A computer-implemented method comprising:
receiving a query related to data stored in a database that is implemented in computer memory and that includes multiple different tables, where individual ones of the tables include values for attributes of data stored in the database;
based on the received query, identifying attributes of data stored in the database that are relevant to generating a response to the received query;
accessing information that is indicative of attributes for which values are included in the different tables included in the database;
identifying tables included in the database that include values for the attributes identified as being relevant to generating a response to the received query based on having accessed the information indicative of the attributes for which values are included in the different tables included in the database includes:
selecting a first attribute from among the attributes identified as being relevant to generating a response to the received query,
based on having accessed the information indicative of the attributes for which values are included in the different tables included in the database, identifying a first table included in the database that includes values for the first attribute,
selecting a second attribute from among the attributes identified as being relevant to generating a response to the received query, where the second attribute is different from the first attribute and values for the second attribute are not included in the first table, and
identifying a second table included in the database that includes values for the second attribute based on having accessed the information indicative of the attributes for which values are included in the different tables included in the database includes:
based on having accessed the information indicative of the attributes for which values are included in the different tables included in the database, identifying multiple tables included in the database that include values for the second attribute;
identifying, from among the multiple tables identified as tables that include values for the second attribute, multiple tables as tables that can be joined directly to the first table;
determining, for each table identified as a table that includes values for the second attribute that can be joined directly to the first table, a number of attributes identified as being relevant to generating a response to the received query for which values are included in the table other than the second attribute and any attributes identified as being relevant to generating a response to the received query for which values are included in the first table;
based on having determined, for each table identified as a table that includes values for the second attribute that can be joined directly to the first table, the number of attributes identified as being relevant to generating a response to the received query for which values are included in the table other than the second attribute and any attributes identified as being relevant to generating a response to the received query for which values are included in the first table, identifying multiple tables that include values for more attributes identified as being relevant to generating a response to the received query other than the second attribute and any attributes identified as being relevant to generating a response to the received query for which values are included in the first table than any of the other tables identified as tables that include values for the second attribute that can be joined directly to the first table;
determining that a particular one of the tables identified as tables that include values for the second attribute, that can be joined directly to the first table, and that include values for more attributes identified as being relevant to generating a response to the received query other than the second attribute and any attributes identified as being relevant to generating a response to the received query for which values are included in the first table than any of the other tables identified as tables that include values for the second attribute that can be joined directly to the first table includes values for fewer attributes than any of the other tables identified as tables that include values for the second attribute, that can be joined directly to the first table, and that include values for more attributes identified as being relevant to generating a response to the received query other than the second attribute and any attributes identified as being relevant to generating a response to the received query for which values are included in the first table than any of the other tables identified as tables that include values for the second attribute that can be joined directly to the first table; and
selecting the particular table as a consequence of having determined that the particular table includes values for fewer attributes than any of the other tables identified as tables that include values for the second attribute, that can be joined directly to the first table, and that include values for more attributes identified as being relevant to generating a response to the received query other than the second attribute and any attributes identified as being relevant to generating a response to the received query for which values are included in the first table than any of the other tables identified as tables that include values for the second attribute that can be joined directly to the first table; and
joining tables included in the database identified as including values for attributes identified as being relevant to generating a response to the received query to create, within computer memory, a new table that reflects relationships between values of attributes identified as being relevant to generating a response to the received query includes joining the first and second tables to create a new table that reflects relationships between values of the first attribute and values of the second attribute.

6. A computer-implemented method comprising:
receiving a query related to data stored in a database that is implemented in computer memory and that includes multiple different tables, where individual ones of the tables include values for attributes of data stored in the database;
based on the received query, identifying attributes of data stored in the database that are relevant to generating a response to the received query based on the received query includes:
identifying a filter to be applied to values of a first attribute of data stored in the database, and
identifying a second attribute that is relevant to generating a response to the received query includes identifying another filter to be applied to values of a second attribute of data stored in the database;
accessing information that is indicative of attributes for which values are included in the different tables included in the database;
identifying tables included in the database that include values for the attributes identified as being relevant to generating a response to the received query based on having accessed the information indicative of the attributes for which values are included in the different tables included in the database includes:
  based on having accessed the information indicative of the attributes for which values are included in the different tables included in the database, identifying a first table that includes values for one or more attributes for applying the filter to values of the first attribute, and
  identifying a second table that includes values for the second attribute identified as being relevant to generating a response to the received query based on having accessed the information indicative of the attributes for which values are included in the different tables included in the database includes identifying a second table that includes values for one or more attributes for applying the other filter to values of the second attribute; and
joining tables included in the database identified as including values for attributes identified as being relevant to generating a response to the received query to create, within computer memory, a new table that reflects relationships between values of attributes identified as being relevant to generating a response to the received query includes:
  applying the filter to the values of the first attribute included in the first table to generate a filtered first table, and
  joining the second table to the filtered first table to create a new table that reflects relationships between the filtered values of the first attribute and values of the second attribute includes:
    applying the other filter to the values of the second attribute included in the second table to generate a filtered second table, and
    joining the filtered second table to the filtered first table to create a new table that reflects relationships between the filtered values of the first attribute and the filtered values of the second attribute.

7. The method of claim 6 wherein:
identifying attributes of data stored in the database that are relevant to generating a response to the received query based on the received query includes identifying one or more additional filters to be applied to values of one or more additional attributes of data stored in the database; and
identifying a second table that includes values for one or more attributes for applying the other filter to values of the second attribute includes:
  identifying multiple tables that include values for one or more attributes for applying the other filter to values of the second attribute,
  determining, for each table identified as including values for one or more attributes for applying the other filter to values of the second attribute, a number of the one or more additional filters that can be applied to the table,
  determining, for each table identified as including values for one or 10 more attributes for applying the other filter to values of the second attribute, a cost associated with joining the table to the first table,
  computing, for each table identified as including values for one or more attributes for applying the other filter to values of the second attribute, a ratio of the number of additional filters that can be applied to the table to the cost associated with joining the table to the first table,
  determining that the ratio computed for a particular one of the tables identified as including values for one or more attributes for applying the other filter to the values of the second attribute is greater than the ratios computed for the other tables identified as including values for one or more attributes for applying the other filter to the values of the second attribute, and
  selecting the particular table as the second table as a consequence of having determined that the ratio computed for a particular one of the tables identified as including values for one or more attributes for applying the other filter to the values of the second attribute is greater than the ratios computed for the other tables identified as including values for one or more attributes for applying the other filter to the values of the second attribute.

8. The method of claim 6 wherein:
identifying attributes of data stored in the database that are relevant to generating a response to the received query based on the received query includes identifying one or more additional filters to be applied to values of one or more additional attributes of data stored in the database; and
identifying a second table that includes values for one or more attributes for applying the other filter to values of the second attribute includes:
  identifying multiple tables that include values for one or more attributes for applying the other filter to values of the second attribute,
  determining, for each table identified as including values for one or more attributes for applying the other filter to values of the second attribute, a number of the one or more additional filters that can be applied to the table,
  determining, for each table identified as including values for one or more attributes for applying the other filter to values of the second attribute, a cost associated with joining the table to the first table,
  computing, for each table identified as including values for one or more attributes for applying the other filter to values of the second attribute, a ratio of the number of additional filters that can be applied to the table to the cost associated with joining the table to the first table,
  identifying multiple of the tables identified as including values for one or more attributes for applying the other filter to the values of the second attribute for which the computed ratios are greater than the ratios computed for the other tables identified as including values for one or more attributes for applying the other filter to the values of the second attribute,
  determining that only a particular one of the tables identified as including values for one or more attributes for applying the other filter to the values of the second attribute for which the computed ratios are greater than the ratios computed for the other tables identified as including values for one or more attributes for applying the other filter to the values of the second attribute can be joined directly to the first table, and selecting the particular table as the second table as a consequence of having determined that only the particular table can be joined directly to the first table.

9. The method of claim 6 wherein:
identifying attributes of data stored in the database that are relevant to generating a response to the received query based on the received query includes identifying one or more additional filters to be applied to values of one or more additional attributes of data stored in the database; and
identifying a second table that includes values for one or more attributes for applying the other filter to values of the second attribute includes:
 identifying multiple tables that include values for one or more attributes for applying the other filter to values of the second attribute,
 determining, for each table identified as including values for one or more attributes for applying the other filter to values of the second attribute, a number of the one or more additional filters that can be applied to the table,
 determining, for each table identified as including values for one or more attributes for applying the other filter to values of the second attribute, a cost associated with joining the table to the first table,
 computing, for each table identified as including values for one or more attributes for applying the other filter to values of the second attribute, a ratio of the number of additional filters that can be applied to the table to the cost associated with joining the table to the first applied to the table,
 identifying multiple of the tables identified as including values for one or more attributes for applying the other filter to the values of the second attribute for which the computed ratios are greater than the ratios computed for the other tables identified as including values for one or more attributes for applying the other filter to the values of the second attribute,
 determining that multiple of the tables identified as including values for one or more attributes for applying the other filter to the values of the second attribute for which the computed ratios are greater than the ratios computed for the other tables identified as including values for one or more attributes for applying the other filter to the values of the second attribute can be joined directly to the first table,
 determining, for each table identified as including values for one or more attributes for applying the other filter to the values of the second attribute for which the computed ratios are greater than the ratios computed for the other tables identified as including values for one or more attributes for applying the other filter to the values of the second attribute that can be joined directly to the first table, a number of attributes identified as being relevant to generating a response to the received query for which values are included in the table other than the second attribute and any attributes identified as being relevant to generating a response to the received query for which values are included in the first table,
 based on having determined, for each table identified as including values for one or more attributes for applying the other filter to the values of the second attribute for which the computed ratios are greater than the ratios computed for the other tables identified as including values for one or more attributes for applying the other filter to the values of the second attribute that can be joined directly to the first table,
 identifying, from among the tables identified as including values for one or more attributes for applying the other filter to the values of the second attribute for which the computed ratios are greater than the ratios computed for the other tables identified as including values for one or more attributes for applying the other filter to the values of the second attribute that can be joined directly to the first table, a particular table as including values for the greatest number of attributes identified as being relevant to generating a response to the received query other than the second attribute and any attributes identified as being relevant to generating a response to the received query for which values are included in the first table, and
 selecting the particular table as the second table as a consequence of having determined that the particular table includes values for the greatest number of attributes identified as being relevant to generating a response to the received query other than the second attribute and any attributes identified as being relevant to generating a response to the received query for which values are included in the first table.

10. The method of claim 6 wherein:
identifying attributes of data stored in the database that are relevant to generating a response to the received query based on the received query includes identifying one or more additional filters to values of one or more additional attributes of data stored in the database; and
identifying a second table that includes values for one or more attributes for applying the other filter to values of the second attribute includes:
 identifying multiple tables that include values for one or more attributes for applying the other filter to values of the second attribute,
 determining, for each table identified as including values for one or more attributes for applying the other filter to values of the second attribute, a number of the one or more additional filters that can be applied to the table,
 determining, for each table identified as including values for one or more attributes for applying the other filter to values of the second attribute, a cost associated with joining the table to the first table,
 computing, for each table identified as including values for one or more attributes for applying the other filter to values of the second attribute, a ratio of the number of additional filters that can be applied to the table to the cost associated with joining the table to the first table,
 identifying multiple of the tables identified as including values for one or more attributes for applying the other filter to the values of the second attribute for which the computed ratios are greater than the ratios computed for the other tables identified as including values for one or more attributes for applying the other filter to the values of the second attribute,
 determining that multiple of the tables identified as including values for one or more attributes for applying the other filter to the values of the second attribute for which the computed ratios are greater than the ratios computed for the other tables identified as including values for one or more attributes for applying the other filter to the values of the second attribute can be joined directly to the first table, determining, for each table identified as including values for one or more attributes for applying the other filter to the values of the second attribute for which the computed ratios are greater than the ratios computed for the other tables identified as including values for one or more attributes for applying the other filter to the values of the second attribute that can be joined directly to the first table, a number of attributes identified as being relevant to generating a response to the received query for which values are included in the table other than the second attribute and any attributes identified as being relevant to generating a response to the received query for which values are included in the first table, based on having determined, for each table identified as including values for one or more attributes for applying the other filter to the values of the second attribute for which the computed ratios are greater than the ratios computed for the other tables identified as including values for one or more attributes for applying the other filter to the values of the second attribute that can be joined directly to the first table, identifying, from among the tables identified as including values for one or more attributes for applying the other filter to the values of the second attribute for which the computed ratios are greater than the ratios computed for the other tables identified as including values for one or more attributes for applying the other filter to the values of the second attribute that can be joined directly to the first table, multiple tables as including values for more attributes identified as being relevant to generating a response to the received query other than the second attribute and any attributes identified as being relevant to generating a response to the received query for which values are included in the first table than any of the other tables identified as including values for one or more attributes for applying the other filter to the values of the second attribute for which the computed ratios are greater than the ratios computed for the other tables identified as including values for one or more attributes for applying the other filter to the values of the second attribute that can be joined directly to the first table, determining, for each table identified as including values for more attributes identified as being relevant to generating a response to the received query other than the second attribute and any attributes identified as being relevant to generating a response to the received query for which values are included in the first table than any of the other tables identified as including values for one or more attributes for applying the other filter to the values of the second attribute for which the computed ratios are greater than the ratios computed for the other tables identified as including values for one or more attributes for applying the other filter to the values of the second attribute that can be joined directly to the first table, a number of attributes identified as being relevant to generating a response to the received query for which values are included in the table other than the second attribute and any attributes identified as being relevant to generating a response to the received query for which values are included in the first table;

based on having determined, for each table identified as including values for more attributes identified as being relevant to generating a response to the received query other than the second attribute and any attributes identified as being relevant to generating a response to the received query for which values are included in the first table than any of the other tables identified as including values for one or more attributes for applying the other filter to the values of the second attribute for which the computed ratios are greater than the ratios computed for the other tables identified as including values for one or more attributes for applying the other filter to the values of the second attribute that can be joined directly to the first table, the number of attributes identified as being relevant to generating a response to the received query for which values are included in the table other than the second attribute and any attributes identified as being relevant to generating a response to the received query for which values are included in the first table, identifying multiple tables that include values for more attributes identified as being relevant to generating a response to the received query other than the second attribute and any attributes identified as being relevant to generating a response to the received query for which values are included in the first table than any of the other tables identified as tables that include values for the second attribute that can be joined directly to the first table;

determining that a particular one of the tables identified as tables that include values for more attributes identified as being relevant to generating a response to the received query other than the second attribute and any attributes identified as being relevant to generating a response to the received query for which values are included in the first table than any of the other tables identified as tables that include values for the second attribute that can be joined directly to the first table includes values for fewer attributes than any of the other tables identified as tables that include values for more attributes identified as being relevant to generating a response to the received query other than the second attribute and any attributes identified as being relevant to generating a response to the received query for which values are included in the first table than any of the other tables identified as tables that include values for the second attribute that can be joined directly to the first table, and selecting the particular table as a consequence of having determined that the particular table includes values for fewer attributes than any of the other tables identified as tables that include values for more attributes identified as being relevant to generating a response to the received query other than the second attribute and any attributes identified as being relevant to generating a response to the received query for which values are included in the first table than any of the other tables identified as tables that include values for the second attribute that can be joined directly to the first table.

11. A computer-implemented method comprising:

receiving a query related to data stored in a database that is implemented in computer memory and that includes multiple different tables, where individual ones of the tables include values for attributes of data stored in the database;

based on the received query, identifying attributes of data stored in the database that are relevant to generating a response to the received query;

accessing information that is indicative of attributes for which values are included in the different tables included in the database;

based on having accessed the information indicative of the attributes for which values are included in the different tables included in the database, identifying tables included in the database that include values for the attributes identified as being relevant to generating a response to the received query;

joining tables included in the database identified as including values for attributes identified as being relevant to generating a response to the received query to create, within computer memory, a new table that reflects relationships between values of attributes identified as being relevant to generating a response to the received query;

identifying, based on the received query, a first filter to be applied to values of a first attribute that is related to a particular attribute such that application of the first filter returns values for the particular attribute that are related to at least one value of the first attribute specified by the first filter;

identifying, based on the received query, other filters to be applied to values of other attributes that are related to the particular attribute such that application of each other filter returns values for the particular attribute that are related to at least one value of another attribute specified by the other filter;

determining that values for the particular attribute that are returned responsive to applying the first filter and that values for the particular attribute that are returned responsive to applying the other filters can be represented as bit vector filters on a lookup table for the particular attribute included in the database;

based on having accessed the information indicative of the attributes for which values are included in the different tables included in the database, identifying multiple tables included in the database that include values for the first attribute and the particular attribute;

determining, for each table identified as including values for the first attribute and the particular attribute, a number of the other attributes for which values are included in the table;

based on having determined, for each table identified as including values for the first attribute and the particular attribute, the number of the other attributes for which values are included in the table, determining that a particular one of the tables identified as including values for the first attribute and the particular attribute includes a greater number of the other attributes than any of the other tables identified as including values for the first attribute and the particular attribute;

applying the first filter to values of the first attribute included in the particular table;

representing results of applying the first filter to values of the first attribute included in the particular table as a first bit vector filter on the lookup table for the particular attribute;

for each of the other attributes for which values are included in the particular table:
applying a corresponding one of the other filters to values of the other attribute included in the particular table, and
representing results of applying the corresponding other filter to values of the other attribute included in the particular table as another bit vector filter on the lookup table for the particular attribute;

for each of the other attributes for which values are not included in the particular table:
applying a corresponding one of the other filters to values of the other attribute included in a table that includes values for the other attribute and the particular attribute, and
representing results of applying the corresponding other filter to values of the other attribute included in the table as an additional bit vector filter on the lookup table for the particular attribute;

combining the bit vector filters on the lookup table for the particular attribute representing the results of applying the first filter and the other filters to create a new bit vector filter on the lookup table for the particular attribute; and applying the new bit vector filter to the lookup table for the particular attribute to generate a filtered lookup table for the particular attribute, wherein:
joining the tables included in the database identified as including values for the attributes identified as being relevant to generating a response to the received query includes joining the filtered lookup table to a table including values for at least one attribute identified as being relevant to generating a response to the received query.

12. The method of claim 11 further comprising:
storing, in computer memory, the first bit vector filter on the lookup table for the particular attribute;
receiving an additional query related to data stored in the database;
determining, based on the additional received query, that the first filter is relevant to generating a response to the additional received query; and
accessing the stored first bit vector filter on the lookup table for the particular attribute as part of generating a response to the additional received query as a consequence of having determined that the first filter is relevant to generating a response to the additional received query.

13. A computer-implemented method comprising:
receiving a query related to data stored in a database that is implemented in computer memory and that includes multiple different tables, where individual ones of the tables include values for attributes of data stored in the database;
based on the received query, identifying attributes of data stored in the database that are relevant to generating a response to the received query;
accessing information that is indicative of attributes for which values are included in the different tables included in the database;
based on having accessed the information indicative of the attributes for which values are included in the different tables included in the database, identifying tables included in the database that include values for the attributes identified as being relevant to generating a response to the received query;
joining tables included in the database identified as including values for attributes identified as being relevant to generating a response to the received query to create, within computer memory, a new table that reflects relationships between values of attributes identified as being relevant to generating a response to the received query;
identifying, based on the received query, a filter to be applied to values of at least a first attribute of data stored in the database that is related to a second attribute of data stored in the database;

determining that values for both the first and second attributes are included in the new table; and applying the filter to values of the first attribute included in the new table to create, within computer memory, a filtered new table that reflects relationships between the filtered values of the first attribute and values of the second attribute.

14. A computer-implemented method comprising:

receiving a query related to data stored in a database that is implemented in computer memory and that includes multiple different tables including (i) a first fact table that includes first facts associated with values of a first attribute, and (ii) a second fact table that includes second facts associated with values of a second attribute;

based on the received query, identifying attributes of data stored in the database that are relevant to generating a response to the received query based on the received query includes:

identifying, based on the received query, a first metric to be computed based on the first facts included in the first fact table, as a consequence of identifying the first metric as a metric to be computed based on the first facts included in the first fact table, identifying the first attribute as an attribute that is relevant to generating a response to the query based on the association of the first facts with values of the first attribute included in the first fact table, identifying, based on the received query, a second metric to be computed based on the second facts included in the second fact table, and as a consequence of identifying the second metric as a metric to be computed based on the second facts included in the second fact table, identifying the second attribute as an attribute that is relevant to generating a response to the query based on the association of the second facts with values of the second attribute included in the second fact table;

accessing information that is indicative of attributes for which values are included in the different tables included in the database;

based on having accessed the information indicative of the attributes for which values are included in the different tables included in the database, identifying tables included in the database that include values for the attributes identified as being relevant to generating a response to the received query; and joining tables included in the database identified as including values for attributes identified as being relevant to generating a response to the received query to create, within computer memory, a new table that reflects relationships between values of attributes identified as being relevant to generating a response to the received query includes joining tables included in the database identified as including values for attributes identified as being relevant to generating a response to the received query to create, within computer memory, a new table that reflects relationships between values for the first attribute and values for the second attribute;

computing the first metric using values of the first attribute included in the new table as keys into the first fact table; and computing the second metric using values of the second attribute included in the new table as keys into the second fact table.

15. A computer-implemented method comprising:

receiving a query related to data stored in a database that is implemented in computer memory and that includes multiple different tables, where individual ones of the tables include values for attributes of data stored in the database;

based on the received query, identifying attributes of data stored in the database that are relevant to generating a response to the received query based on the received query includes:

identifying one or more attributes for which values are to be returned in a response to the received query, identifying one or more attributes that are relevant to computing a metric to be returned in response to the received query, identifying an attribute by which results of the metric are to be grouped, and identifying one or more attributes as keys to a fact table that stores facts that are relevant to generating a response to the received query;

accessing information that is indicative of attributes for which values are included in the different tables included in the database;

based on having accessed the information indicative of the attributes for which values are included in the different tables included in the database, identifying tables included in the database that include values for the attributes identified as being relevant to generating a response to the received query; and joining tables included in the database identified as including values for attributes identified as being relevant to generating a response to the received query to create, within computer memory, a new table that reflects relationships between values of attributes identified as being relevant to generating a response to the received query.

* * * * *